(12) United States Patent
Nabata et al.

(10) Patent No.: US 9,377,361 B2
(45) Date of Patent: Jun. 28, 2016

(54) HUMAN BODY DETECTING SYSTEM

(75) Inventors: Toshihisa Nabata, Yokohama (JP);
Akira Koyama, Yokohama (JP);
Takanori Hashizume, Yokohama (JP);
Akinori Kanai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 817 days.

(21) Appl. No.: 13/593,146

(22) Filed: Aug. 23, 2012

(65) Prior Publication Data
US 2013/0053099 A1 Feb. 28, 2013

(30) Foreign Application Priority Data

Aug. 25, 2011 (JP) .................................. 2011-184116

(51) Int. Cl.
| | |
|---|---|
| *G01J 5/06* | (2006.01) |
| *G01J 5/02* | (2006.01) |
| *G01J 5/04* | (2006.01) |
| *G01J 5/34* | (2006.01) |
| *G01J 5/08* | (2006.01) |
| *G01J 5/00* | (2006.01) |

(52) U.S. Cl.
CPC ................ *G01J 5/025* (2013.01); *G01J 5/0025* (2013.01); *G01J 5/026* (2013.01); *G01J 5/028* (2013.01); *G01J 5/0265* (2013.01); *G01J 5/047* (2013.01); *G01J 5/0846* (2013.01); *G01J 5/0893* (2013.01); *G01J 5/34* (2013.01); *G01J 2005/068* (2013.01)

(58) Field of Classification Search
CPC ......... G01J 5/025; G01J 5/0846; G01J 5/047; G01J 5/34; G01J 5/028; G01J 5/0265; G01J 5/0025; G01J 5/0893; G01J 5/026; G01J 2005/068
See application file for complete search history.

(56) References Cited

U.S. PATENT DOCUMENTS

| | | | |
|---|---|---|---|
| 6,080,981 A * | 6/2000 | Payne ........................... | 250/221 |
| 6,188,916 B1 * | 2/2001 | Noda et al. .................... | 455/567 |
| 6,633,231 B1 * | 10/2003 | Okamoto et al. ......... | 340/539.11 |
| 2007/0258083 A1 * | 11/2007 | Heppell et al. .................. | 356/39 |

FOREIGN PATENT DOCUMENTS

| | | |
|---|---|---|
| JP | 2-187690 A | 7/1990 |
| JP | 6-62134 A | 3/1994 |
| JP | 6-87832 U | 12/1994 |

(Continued)

OTHER PUBLICATIONS

Office Action mailed Dec. 9, 2014, corresponding to Japanese patent application No. 2011-184116, for which an explanation of relevance is attached.

*Primary Examiner* — David Porta
*Assistant Examiner* — Shun Lee
(74) *Attorney, Agent, or Firm* — Hauptman Ham, LLP

(57) ABSTRACT

According to an aspect, a human body detecting system includes a mobile communication device, a stand, and a false detection reducing unit. The mobile communication device includes a communication unit for performing communication. The stand includes a human sensor for detecting a human body based on an ambient temperature distribution, and a storage unit for storing detection information of the human sensor. The false detection reducing unit is configured to perform false detection reducing processing on at least either one of the detection information of the human sensor and operation of the human sensor.

19 Claims, 19 Drawing Sheets

(56) References Cited

FOREIGN PATENT DOCUMENTS

| JP | 8-159871 A | 6/1996 |
| JP | 2000-338261 A | 12/2000 |
| JP | 2005-244369 A | 9/2005 |
| JP | 2006-226988 A | 8/2006 |
| JP | 2007-114016 A | 5/2007 |
| JP | 2008-245086 A | 10/2008 |
| JP | 2010-067241 A | 3/2010 |
| JP | 2010-230492 A | 10/2010 |

* cited by examiner

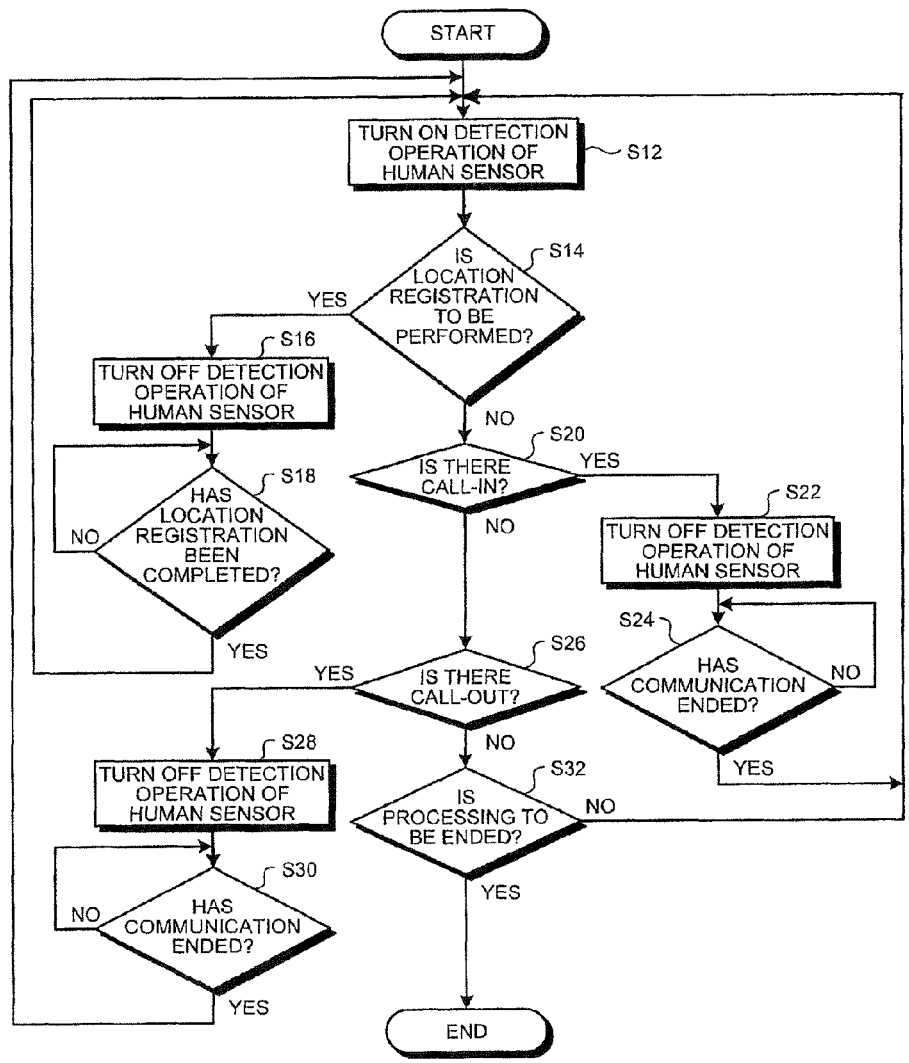

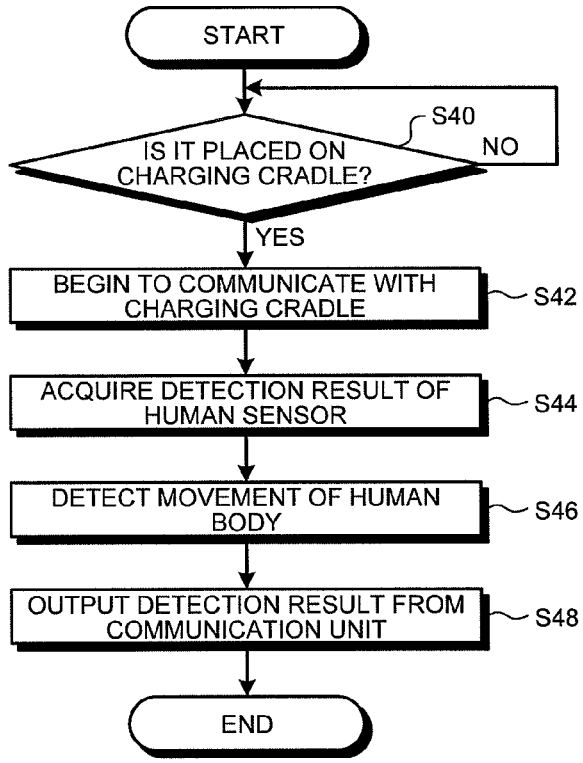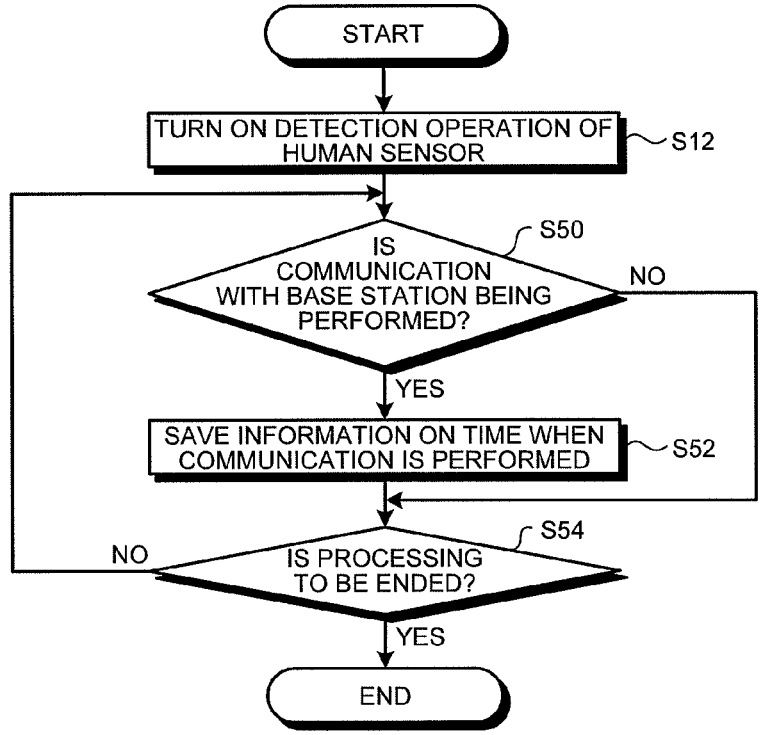

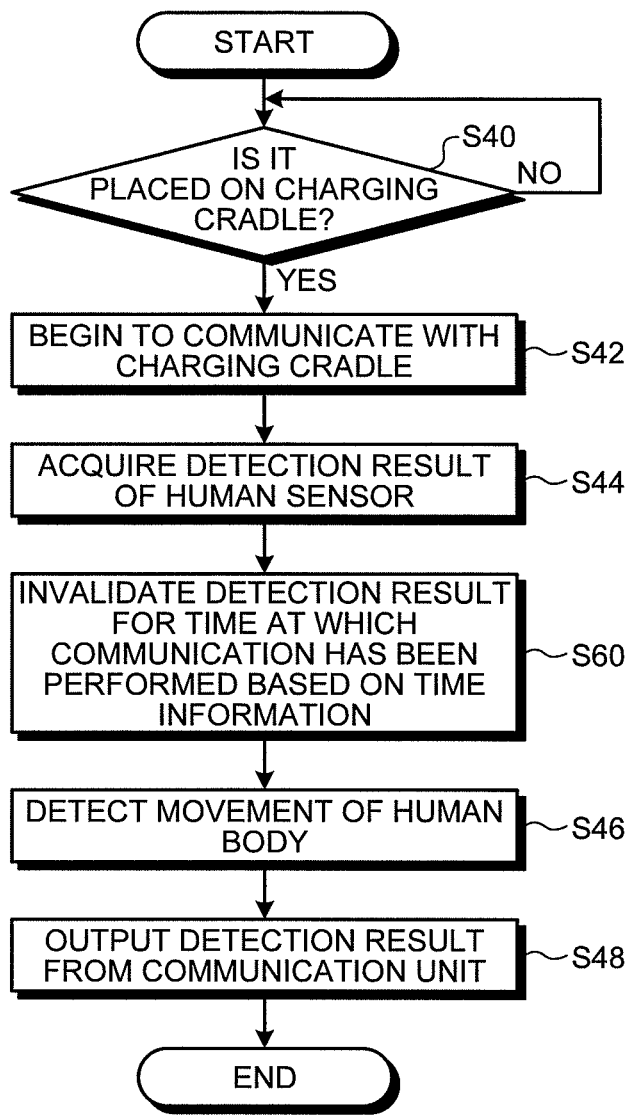

HUMAN BODY DETECTING SYSTEM

CROSS-REFERENCE TO RELATED APPLICATIONS

This application claims priority from Japanese Application No. 2011-184116, filed on Aug. 25, 2011, the content of which is incorporated by reference herein in its entirety.

BACKGROUND

1. Technical Field

The present disclosure relates to a human body detecting system including a human sensor that detects a human.

2. Description of the Related Art

Recently, mobile communication devices such as mobile phones are equipped with various functions. For example, Japanese Patent Application Laid-Open No. 2010-67241 discloses a mobile communication device (e.g., a mobile terminal device) including a human sensing unit configured by using a pyroelectric sensor or the like which detects infrared rays radiated from the body temperature of a human and his/her motion. When the result of detecting the presence of the motion by using the human sensing unit reveals that there is no motion for a certain period of time, the mobile communication device outputs alarming sound. The above-mentioned literature further discloses a system in which human sensing units are installed in a living space in the house, and a mobile terminal charging device and human-detecting device receives the result of the detection of the human sensing units. In this system, when a human body cannot be detected by any of the human sensing units for a certain period of time, information is output from the mobile terminal charging device and human-detecting device and transmitted to a mobile communication device via a communication means such as Bluetooth and then alarming sound is output from the mobile communication device. Moreover, when no manipulation is detected for a certain period of time after the alarming sound is outputted, such a situation is notified to a predetermined communication device.

As described in the above-mentioned literature, a human body is detected by the human sensor and the safety of the user of the mobile communication device can be confirmed by such detection. Moreover, the mobile communication device can detect the presence of a human body in its surroundings, and use the detection result for crime prevention. Moreover, in recent years, a configuration has been also proposed in which a support to support a mobile communication device, such as a charging cradle, is equipped with the human sensor.

Incidentally, when infrared rays radiated from the body temperature of a human are detected by a pyroelectric infrared sensor serving as the human sensor, a false detection of a human body is likely to occur. That is, there are cases where a human body is falsely detected or a human body cannot be detected. As such, when the detection accuracy of the human sensor is low, an adequate control cannot be performed.

For the foregoing reasons, there is a need for a human body detecting system that can detect a nearby human body with high accuracy.

SUMMARY

According to an aspect, a human body detecting system includes a mobile communication device, a stand, and a false detection reducing unit. The mobile communication device includes a communication unit for performing communication. The stand includes a human sensor for detecting a human body based on an ambient temperature distribution, and a storage unit for storing detection information of the human sensor. The false detection reducing unit is configured to perform false detection reducing processing on at least either one of the detection information of the human sensor and operation of the human sensor.

BRIEF DESCRIPTION OF THE DRAWINGS

FIGS. 4 and 5 are flowcharts illustrating an example of an operation of the human body detecting system;

FIGS. 6 and 7 are flowcharts illustrating another example of operation of the human body detecting system;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of a mobile communication device of a human body detecting system; however, the present invention is not limited to mobile phones. Therefore, the present invention can be applied to a variety of devices equipped with a communication function, including but not limited to personal handyphone systems (PHS), personal digital assistants (PDA), portable navigation units, personal computers (including but not limited to tablet computers, netbooks etc.), media players, portable electronic reading devices, and gaming devices. Moreover, in the following description, a charging cradle of a mobile communication device is used to explain as an example of a stand of a human body detecting system; however, the present invention is not limited to charging cradles. Therefore, the present invention can be applied to a variety of stands disposed in a measuring target range.

Figure 1:
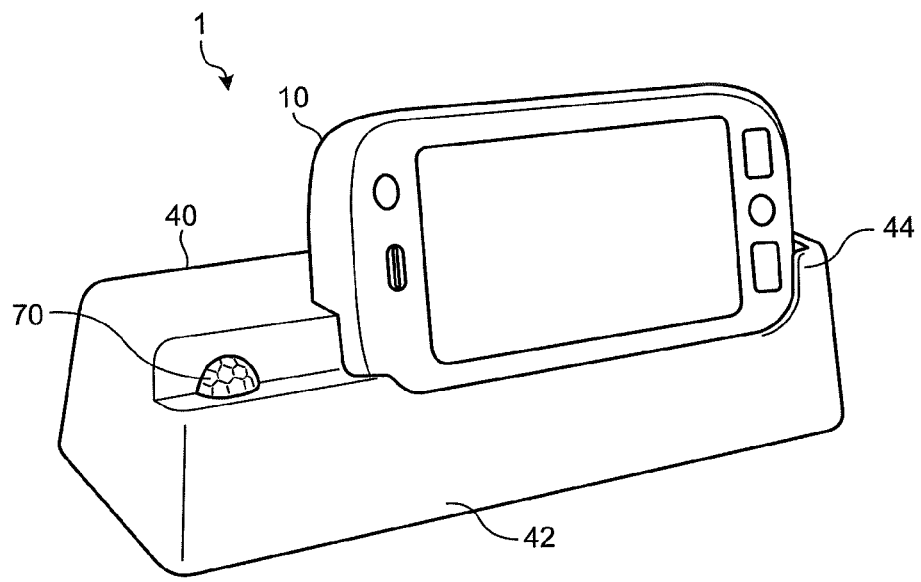
FIG. 1 is a perspective view illustrating a schematic configuration of a human body detecting system.
Figure 2:
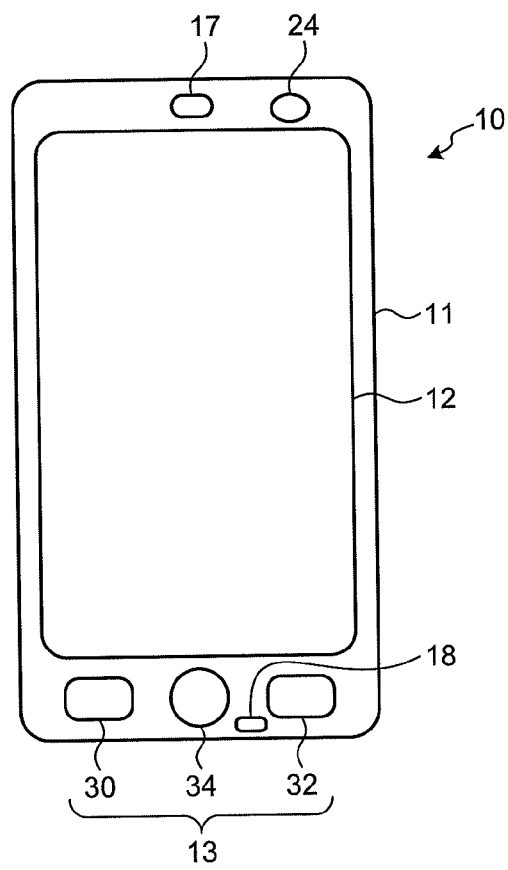
FIG. 2 is a front view of a mobile phone included in the human body detecting system illustrated in FIG. 1.
Figure 3:
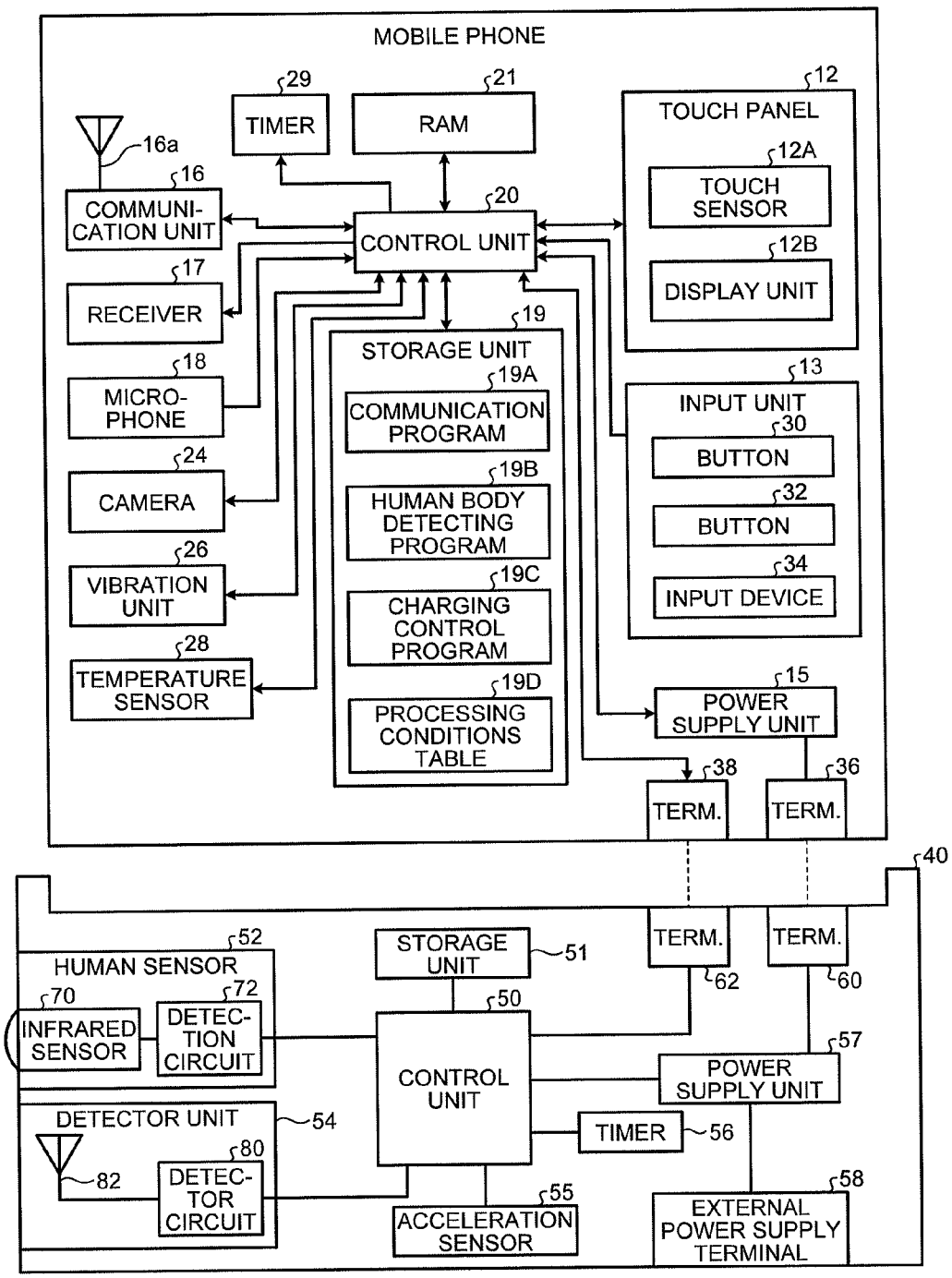
FIG. 3 is a block diagram illustrating a schematic configuration of functions of the human body detecting system.

FIG. 1 is a perspective view illustrating a schematic configuration of a human body detecting system of an embodiment. FIG. 2 is a front view of a mobile phone of the human body detecting system illustrated in FIG. 1. FIG. 3 is a block diagram illustrating a schematic configuration of functions of the human body detecting system. The human body detecting system 1 illustrated in FIG. 1 includes a mobile phone 10 and a charging cradle 40.

The mobile phone 10 includes a thin plate-like housing 11 as illustrated in FIGS. 1 and 2. The mobile phone 10 is provided with an input unit 13 including a touch panel 12, a button 30, a button 32, and an input device 34; a receiver 17; a microphone 18; and a camera 24 on the surface of the housing 11. The touch panel 12 is disposed on a face of the plate-like housing 11 having the largest area. The input unit 13 is disposed on the same face of the housing 11 as the touch panel 12, especially at one end portion in the longitudinal direction of the housing 11. The input unit 13 is also disposed such that the button 30, the input device 34, and the button 32 are arranged in this order from one side to the other side in the traverse direction. The receiver 17 is disposed on the same face of the housing 11 as the touch panel 12 especially at the other end of the housing in the longitudinal direction, in other words, at an end portion opposite to the end portion where the input unit 13 is disposed. Moreover, the microphone 18 is disposed on the face of the housing 11 on which the touch panel 12 is disposed, especially at the one end portion in the longitudinal direction, that is, at the end portion where the input unit 13 is disposed. Moreover, the camera 24 is disposed on the face of the housing 11 on which the touch panel 12 is disposed, especially at a location near the receiver 17.

The touch panel 12 displays characters, diagrams, images, and the like and detects contact(s), whereby the mobile phone 10 detects various kinds of operations performed on the touch panel 12 with a finger, a stylus, a pen (point of a pen or a point of a bar-like member), and the like (in the description herein below, for the sake of simplicity, it is assumed that the user touches the touch panel 12 with his/her finger(s)). For example, the mobile phone 10 displays a virtual keyboard on the touch panel 12 to allow the user to input characters. The mobile phone 10 detects various kinds of operations performed on the touch panel 12 with the finger in a state in contact the virtual keyboard is displayed on the touch panel 12, detects which key of the virtual key board is pressed or touched with the finger, and determines the key, which is pressed or touched with the finger, to be an input key. In this way, characters can be input to the mobile phone 10. Moreover, the mobile phone 10 detects input of various kinds of manipulations based on a displayed image and various kinds of operations performed on the touch panel 12 with the finger, as well as the input of the characters, and performs various kinds of controls based on the manipulations which are input.

When the buttons 30 and 32 are pressed, the mobile phone 10 activates the function corresponding to the pressed button. Moreover, the mobile phone 10 also detects an operation, which is input to the input device 34, as the manipulation and performs various kinds of controls based on the manipulations which are input. For example, the mobile phone 10 detects a direction instructing manipulation and a determining manipulation via the input device 34. The input device 34 is configured by using a touch pad, an optical input device, an input device with four direction buttons and a central button, or the like.

The charging cradle 40 is a stand on which the mobile phone 10 is to be placed. The charging cradle 40 is configured such that a support portion 44, on which the mobile phone 10 is to be placed, is formed in a housing 42. The support portion 44 takes the form conforming to the housing 11 of the mobile phone 10, and supports the mobile phone 10 in a specific attitude. Moreover, the charging cradle 40 is provided with an infrared sensor 70 which is disposed in a portion of the housing 42.

Then, relationships between functions of human body detecting system 1 and a control unit will be described. FIG. 3 is a block diagram illustrating a schematic configuration of the functions of the human body detecting system. As illustrated in FIG. 3, the mobile phone 10 includes the touch panel 12, the input unit 13, a power supply unit 15, a communication unit 16, the receiver 17, the microphone 18, a storage unit 19, a control unit 20, a RAM (Random Access Memory) 21, the camera 24, a vibration unit 26, a temperature sensor 28, a timer 29, a power supply terminal 36, and a communication terminal 38.

The touch panel 12 includes a display unit 12B, and a touch sensor 12A superposed on the display unit 12B. The touch sensor 12A detects contact(s) with the touch panel 12 as well as contacted location(s), and thereby the control unit 20 detects (determines) various kinds of operations performed on the touch panel 12 with the finger(s). Examples of the operations which are detected (determined) by the control unit 20 through the contact detection of the touch sensor 12A include an operation of bringing the finger in contact with a surface of the touch panel 12, an operation of moving the finger on the touch panel 12 with the finger kept in contact with the touch panel 12, and an operation of moving the finger away from the touch panel 12, and the like. The touch sensor 12A may adopt any type detection method such as a pressure sensitive type detection method, a capacitive type detection method, and the like. The display unit 12B includes a Liquid Crystal Display (LCD), an OELD (Organic Electro-Luminescence Display), or the like, and displays characters, diagrams, images, and the like.

The input unit 13 has the buttons 30 and 32 and the input device 34 as described above. The buttons 30 and 32 receive user's manipulation through a physical input (pressing) operation and transmits a signal corresponding to the received manipulation to the control unit 20. The input device 34 also receives user's manipulation and transmits a signal corresponding to the received manipulation to the control unit 20.

The power supply unit 15 supplies the power obtained from a storage battery or an external power supply to each functional unit of the mobile phone 10 including the control unit 20. The power supply unit 15 is connected to the external power supply via the power supply terminal 36. The communication unit 16 has an antenna 16a, so that the communication unit 16 transmits and receives radio waves by using the antenna 16a. In this way, the communication unit 16 establishes a wireless signal path using a code-division multiple access (CDMA) system, or any other wireless communication protocols, with a base station via a channel allocated by the base station, and performs telephone communication and information communication with the base station. In other words, the communication unit 16 communicates with an external communication device by using a public communication path. Any other wired or wireless communication or network interfaces, e.g., LAN, Bluetooth, Wi-Fi, NFC (Near Field Communication) may also be included in lieu of or in addition to the communication unit 16. The receiver 17 outputs the voice of a communication partner in a telephone communication, a ring tone, and the like. The microphone 18 converts the user's voice or the like into an electric signal.

The storage unit 19 includes one or more non-transitory storage medium, for example, a nonvolatile memory (such as ROM, EPROM, flash card etc.) and/or a storage device (such as magnetic storage device, optical storage device, solid-state storage device etc.), and stores programs and data used for processing performed by the control unit 20. Specifically, the storage unit 19 stores a communication program 19A for enabling communication with an external communication device via the communication unit 16, a human body detecting program 19B for controlling the operation of a human sensor 52 and detecting a human body near the charging cradle 40 based on the detection result of the human sensor 52 of the charging cradle 40 to be described later, a charging control program 19C for charging the storage battery of the power supply unit 15 with power supplied from the power obtained from the external power supply, and a process condition table 19D in which various kinds of conditions used when executing various kinds of programs are stored in association with the various kinds of programs. Moreover, the storage unit 19 may further store other programs and data, for example, an OS (Operating System) program for implementing basic functions of the mobile phone 10, and address book data containing names, telephone numbers, mail addresses, and the like. Moreover, the storage unit 19 may yet further store a program which determines a control operation or processing based on the input manipulation input to the touch panel 12. The control operation and processing include various kinds of operations and processing executed in the mobile phone 10, and specific examples thereof include movement of a cursor or a pointer, switching of display between screens, character inputting processing, and activating and ending processing of various kinds of applications.

The control unit 20 is, for example, a CPU (Central Processing Unit) and integrally controls the operation of the mobile phone 10. Specifically, the control unit 20 controls the touch panel 12, the input unit 13, the communication unit 16, the camera 24, and the like by executing the program stored in the storage unit 19 while referring to the data stored in the storage unit 19 as necessary. In this way, the control unit 20 executes various kinds of processing. The control unit 20 loads data obtained, generated, and/or processed by executing the program or the processing stored in the storage unit 19 into the RAM 21 that provides a temporary storage area as necessary. The program to be executed by the control unit 20 and/or the data to which the control unit 20 refers may be downloaded from a server through communication performed by using the communication unit 16.

The camera 24 electronically takes an image by using an image sensor of a CCD (Charge Coupled Device) type, a CMOS (Complementary Metal Oxide Semiconductor) type, or the like. Then, the camera 24 converts the taken image into a signal and outputs the signal to the control unit 20.

The vibration unit (also referred to as vibrator) 26 is a vibration generating mechanism that causes the housing 11 to vibrate, and it is installed in the housing 11. The eccentricity motor can be used as the vibration generating mechanism of the vibration unit 26. The vibration unit 26 is driven under the control by the controlling control unit 20 and causes the housing 11 to vibrate when notifying reception of a telephone call from another communication device, when notifying arrival of a message such as an E-mail, a C-mail, and a short mail, and/or when using an alarming function.

The temperature sensor 28 is a temperature detecting means disposed to detect the temperature at an internal predetermined location, and it is installed in the housing 11. For example, a thermocouple, a thermistor, a bimetallic thermometer and the like can be used as the temperature detecting means of the temperature sensor 28. The temperature sensor 28 transmits information on the detected temperature to the control unit 20. In the embodiment, the temperature of a predetermined location is detected in a way that control unit 20 performs a calculation by using the temperature detected by the temperature sensor 28.

The timer 29 counts time, and can output information on the time to the control unit 20. Although the timer 29, which measures an elapse of time independently of the control unit 20, is provided, a configuration in which a timer function is incorporated in the control unit 20 may be allowable. The timer 29 can correct a deviation from a reference time point by acquiring information on the time point from the base station or the like via the communication unit 16.

The power supply terminal 36 is a terminal externally exposed from the housing 11, and it is connected to the power supply unit 15. As for the power supply terminal 36, the terminal externally exposed from the housing 11 is connected to a power supply terminal 60 of the charging cradle 40. The power supply terminal 36 transmits the power supplied by the connected terminal to the power supply unit 15. The communication terminal 38 is a terminal externally exposed from the housing 11, and it is connected to the control unit 20. As for the communication terminal 38, the terminal externally exposed from the housing 11 is connected to a communication terminal 62 of the charging cradle 40. The communication terminal 38 performs data communication with the connected communication terminal 62.

Then, the function of the charging cradle 40 will be described. As illustrated in FIG. 3, the charging cradle 40 includes a control unit 50, a storage unit 51, the human sensor 52, a detector unit 54, an acceleration sensor 55, a timer 56, a power supply unit 57, an external power supply terminal 58, the power supply terminal 60, and the communication terminal 62.

The control unit 50 is, for example, a CPU and integrally controls the operation of the charging cradle 40. The control unit 50 includes a RAM (Random Access Memory) in addition to the CPU. Specifically, the control unit 50 controls the human sensor 52, the detector unit 54, the acceleration sensor 55, the timer 56, and the like by executing the program stored in the storage unit 51 while referring to the data stored in the storage unit 51 as necessary. In this way, the control unit 50 executes various kinds of processing. The control unit 50 loads data obtained, generated, and/or processed by executing the program and/or the processing stored in the storage unit 51 into the RAM as necessary. The program to be executed by the control unit 50 and/or the data to which the control unit 50 refers are may be downloaded from the mobile phone 10 through communication performed via the communication terminals 38 and 62.

The storage unit 51 includes one or more non-transitory storage medium, for example, a nonvolatile memory (such as ROM, EPROM, flash card etc.) and/or a storage device (such as magnetic storage device, optical storage device, solid-state storage device etc.), and stores programs and data for use in processing performed by the control unit 50. Specifically, a communication program used to perform communication with the mobile phone 10, a human body detecting program used to detect a human body around the charging cradle 40 and to control the operation of the human sensor 52 based on the detection result of the human sensor 52, and various conditions are stored. Moreover, the storage unit 51 also stores an operating system program and data to realize the basic functions of the charging cradle 40. Moreover, the storage unit 51 also stores the detection results detected by the human sensor 52 and analytical results obtained by analyzing the detection results.

The human sensor 52 includes an infrared sensor 70 and a detection circuit 72. The infrared sensor 70 is disposed to be externally exposed from the housing 42. The infrared sensor 70 is a so-called pyroelectric infrared sensor, and detects a change in the infrared rays radiated from each position (an object at each position) within the surrounding area of the housing 42. The infrared sensor 70 includes many detection elements. The detection elements are arranged like parts of a compound eye to detect changes in temperature at each of the surrounding areas. The detection circuit 72 is a circuit that processes a detection signal (a signal of the amount of the detected infrared rays) output from the infrared sensor 70 into a signal that can be processed by the control unit 50. For example, the detection circuit 72 converts an analog detection signal output from the infrared sensor 70 into a digital signal. The human sensor 52 may process the signal, which has been detected by each of the detection elements so as to determine the presence or absence of a human body, through the processing performed by the detection circuit 72 into a digitized signal which is obtained by digitizing value of the signal using a predetermined threshold.

The detector unit 54 is a device that detects electromagnetic waves reaching the charging cradle 40. The detector unit 54 includes a detector circuit 80 and an antenna 82. The antenna 82 receives the electromagnetic waves reaching the charging cradle 40. The antenna 82 detects electromagnetic waves in a frequency band used for communication, for example, a frequency band near 800 MHz or a frequency band near 2 GHz, i.e., radio waves used for communication. The detector circuit 80 is a circuit that processes the radio waves received by the antenna 82. The detector circuit 80 processes the signal transmitted from the antenna 82 and transmits the result to the control unit 50. Accordingly, the detector unit 54 can detect the presence or absence of the radio waves for communication which reach the charging cradle 40, and detect an output of the radio waves for communication.

The acceleration sensor 55 is a detector that detects acceleration applied to the housing 42. For the acceleration sensor 55, any of detectors, which detect the acceleration using various methods, can be used, and, for example, a detector that detects the acceleration by using changes in capacitance, changes in piezo-resistance, or changes in relative position can be used. The acceleration sensor 55 detects a direction of the acceleration in addition to the magnitude of the acceleration. The acceleration sensor 55 detects the acceleration applied to the housing 42 when the housing 42 is vibrated by the mobile phone 10 or the housing 42 is moved by the user, and transmits information on the detected acceleration to the control unit 50. The control unit 50 detects movements or vibrations of the housing 42 by analyzing the detection result of the acceleration sensor 55, and more specifically by integrating the detected acceleration information.

The timer 56 counts the time and can output information on the time to the control unit 50. In the embodiment, the timer 56, which measures an elapse of time independently of the control unit 50, is provided. However, the control unit 50 may be equipped with a timer function. The timer 56 can correct a deviation from a reference time by acquiring information on the time from the mobile phone 10.

The power supply unit 57 supplies the power obtained from the storage battery or the external power supply to each of functional units of the charging cradle 40 including the control unit 50. Moreover, the power supply unit 57 is connected to an external power supply through the external power supply terminal 58, and is also connected to the power supply terminal 36 of the mobile phone 10 through the power supply terminal 60. The power supply unit 57 transmits the power supplied from the external power supply terminal 58 to the power supply terminal 60. In this way, the charging cradle 40 can supply the power obtained from the external power supply to the mobile phone 10, and can charge the power supply unit 15 of the mobile phone 10 with power.

The external power supply terminal 58 is a terminal externally exposed from the housing 42, and is connected to the external power supply. The external power supply terminal 58 may be connected to the external power supply through an electric wire and an outlet. The external power supply terminal 58 transmits the power, which is supplied from the external power supply, to the power supply unit 57. The power supply terminal 60 is a terminal externally exposed from the housing 42, and is connected to the power supply unit 57. As for the power supply terminal 60, the terminal externally exposed from the housing 42 is connected to the power supply terminal 36 of the mobile phone 10. The power supply terminal 60 transmits the power, which is supplied from the power supply unit 57, to the power supply terminal 36. The communication terminal 62 is a terminal externally exposed from the housing 42, and is connected to the control unit 50. As for the communication terminal 62, the terminal externally exposed from the housing 42 is connected to the communication terminal 38 of the mobile phone 10. The communication terminal 62 performs data communication with the connected communication terminal 38. The power supply terminal 60 and the communication terminal 62 are connected to the power supply terminal 36 and the communication terminal 38, respectively, when the mobile phone 10 is placed on the support portion 44 in a specific attitude.

The human body detecting system 1 has the configuration described above. When the mobile phone 10 is placed on the support portion 44 of the charging cradle 40, the power supply terminal 36 and the power supply terminal 60 are connected to each other and the communication terminal 38 and the communication terminal 62 are connected to each other. The human body detecting system 1 can supply the external power, which is supplied to the charging cradle 40, to the mobile phone 10 when the power supply terminal 36 and the power supply terminal 60 are connected to each other. Moreover, in the human body detecting system 1, communication is performed between the control unit 20 and the control unit 50 so that transmission and reception of information can be performed when the communication terminal 38 and the communication terminal 62 are connected to each other.

In the human body detecting system 1 of the embodiment, the mobile phone 10 and the charging cradle 40 perform wired communication when the communication terminals thereof are connected to each other; however, the human body detecting system 1 is not limited to such a configuration. In the human body detecting system 1, the mobile phone 10 and the charging cradle 40 may perform communication by using the near-field wireless communication technology. Examples of the near-field wireless communication technology include, but not limited to, IR communication (IrDA, IrMC, and IrSimple), the visible light communication, Bluetooth, and magnetic field communication (RFID (Radio Frequency Identification)) technology.

Then, an example of the operation of the human body detecting system 1 will be described with reference to FIGS. 4 and 5. FIGS. 4 and 5 are flowcharts illustrating an example of the operation of the human body detecting system. The processing procedures illustrated in FIGS. 4 and 5 are repeatedly executed based on functions provided by the human body detecting program 19B. In the following explanation, the description is made in connection with a case where the control unit 20 executes the human body detecting program 19B so that the processing procedure is executed based on functions provided by the human body detecting program 19B; however, the processing procedure or the like may be executed by the control unit 50. In any case where the processing procedure is executed by the control unit 20 or the control unit 50, information is transmitted and received as required through the communication terminals 38 and 62 in the human body detecting system 1. First of all, the control for the detection operation of the human sensor 52 will be described with reference to FIG. 4. The processing illustrated in FIG. 4 is executed in a state in which the mobile phone 10 is placed on the charging cradle 40.

First of all, at Step S12, the control unit 20 turns on a detection operation of the human sensor. In other words, the detection operation of the human sensor 52 for detecting the human body around charging cradle 40 is started. When the detection operation of the human sensor is turned on at Step S12, then at Step S14, the control unit 20 determines whether a location registration is to be performed. The location registration is processing in which the mobile phone 10 communicates with the base station by using communication unit 16 to notify the base station of the location of the mobile phone 10.

When it is determined that the location registration is to be performed (Yes at Step S14), then at Step S16, the control unit 20 turns off the detection operation of the human sensor. In other words, the detection operation of the human sensor 52 to detect the human body around the charging cradle 40 is stopped. When the detection operation is turned off at Step S16, then at Step S18, the control unit 20 determines whether the location registration has been completed. When it is determined that the location registration has not been completed (No at Step S18), the control unit 20 proceeds to Step S18. In other words, the control unit 20 repeats the process of Step S18 until the location registration is completed, that is, until the communication with the base station ends. When it is determined that the location registration has been completed, that is, when it is determined that the communication with the base state has ended (Yes at Step S18), the control unit 20 proceeds to Step S12 and turns on the detection operation of the human sensor again.

When it is determined that the location registration is not to be performed (No at Step S14), then at Step S20, the control unit 20 determines whether a call has arrived, that is, there is a call-in from the base station. When it is determined that there is a call-in (Yes at Step S20), then at Step S22, the control unit 20 turns off the detection operation of the human sensor. When the detection operation is turned off at Step S22, then at Step S24, the control unit 20 determines whether the communication has ended. When it is determined that the communication has not ended (No at Step S24), the control unit 20 proceeds to Step S24 again. In other words, the control unit 20 repeats the process of Step S24 until the communication with the base station ends. When it is determined that the communication has ended (Yes at Step S24), the control unit 20 proceeds to Step S12 and turns on the detection operation of the human sensor again.

When it is determined that there is no call-in (No at Step S20), then at Step S26, the control unit 20 determines whether there is a call-out, that is, whether the mobile phone 10 is connecting to the base station for a call. When it is determined that there is a call-out (Yes at Step S26), then at Step S28, the control unit 20 turns off the detection operation of the human sensor. When the detection operation is turned off at Step S28, then at Step S30, the control unit 20 determines whether the communication has ended. When it is determined that the communication has not ended (No at Step S30), the control unit 20 proceeds to Step S30. In other words, the control unit 20 repeats the process of Step S30 until the communication with the base station ends. When it is determined that the communication has ended (Yes at Step S30), the control unit 20 proceeds to Step S12 and turns on the detection operation of the human sensor again.

When it is determined that there is no call-out (No at Step S26), then at Step S32, the control unit 20 determines whether the processing is to be ended. When it is determined that the processing is not to be ended (No at Step S32), the control unit 20 proceeds to Step S14 and determines whether the location registration is to be performed. When it is determined that the processing is to be ended (Yes at Step S32), the control unit 20 ends the processing. In this way, the control unit 20 switches the detection operation of the human sensor 52 between ON and OFF states.

Then, an operation of processing information detected by the human sensor 52 will be described with reference to FIG. 5. At Step S40, the control unit 20 determines whether the mobile phone 10 is placed on the charging cradle 40. The determination whether the mobile phone 10 is placed on the charging cradle 40 can be similarly made by a process for the case of determining execution of the charging, for example, by detecting whether the terminals are connected. When it is determined that the mobile phone 10 is not placed on the charging cradle (No at Step S40), the control unit 20 proceeds to Step S40. The control unit 20 repeats the process of Step S40 until the placement on the charging cradle 40 is detected.

When it is determined that the mobile phone 10 is placed on the charging cradle (Yes at Step S40), then at Step S42, the control unit 20 starts to communicate with the charging cradle 40. That is, the communication between the control unit 20 and the control unit 50 is started. When the communication is started at Step S42, then at Step S44, the control unit 20 acquires a detection result of the human sensor 52. The control unit 20 reads the detection result of the human sensor 52 stored in the storage unit 51 of the charging cradle 40. When the detection result is acquired at Step S44, the control unit 20 detects a movement of the human body at Step S46, outputs the detection result from the communication unit 16 at Step S48, and ends the processing. In other words, the control unit 20 transmits information on the detection of a movement of a human body in front of the charging cradle 40, or the like, to a predetermined external communication device by communication, which is performed through a wireless communication path by using the communication unit 16.

As illustrated in FIGS. 4 and 5, when the communication with the base station is being performed, the human body detecting system 1 stops the detection operation of the human sensor 52 based on the communication state of the mobile phone 10 since it is assumed that such a period will be a period of a situation in which a false detection is likely to occur. Thus, the human body detecting system 1 can increase the accuracy of detection of a human body. Specifically, since the detection operation by the sensor 52 is suspended during the communication between the mobile phone 10 and the base station is performed, it is possible to suppress the high frequency signal transmitted and received by the mobile phone 10 from being detected by the detection circuit 72. As a result, it is possible to suppress a signal which is different from the signal generated based on the detection result of the infrared sensor 70 from being transmitted to the control unit 50, and therefore the false detection can be prevented.

When the communication between the mobile phone 10 and the base station has ended, the human body detecting system 1 resumes the detection operation of the human sensor 52. Accordingly, the detection operation of the human sensor 52 can be reliably executed in a state in which there is a little likelihood of the false detection. Although the embodiment has been described in connection with the communication with the base station, the above-described techniques can be adopted in a case where another kind of communication is used.

The human body detecting system 1 outputs the detection result to a predetermined communication device so that the situation in the surroundings of the charging cradle 40 can be notified to the predetermined communications device. In other words, information on whether the user has moved in front of the charging cradle 40 for the purpose of charging, information on whether a human has passed by the charging cradle 40, or other information can be notified. As a result, information on the safety of the user of the mobile phone 10 can be mainly notified.

In the processing illustrated in FIGS. 4 and 5, the detection operation of the human sensor 52 is switched between ON and OFF states; however, the processing is not limited thereto. Another example of the operation of the human body detecting system 1 will be described with reference to FIGS. 6 and 7. FIGS. 6 and 7 are flowcharts illustrating another example of the operation of the human body detecting system. Processing procedures illustrated n FIGS. 6 and 7 are repeatedly executed based on functions provided by the human body detecting program 19B. The processing illustrated in FIG. 6 is executed in a state in which the mobile phone 10 is placed on the charging cradle 40. A part of the operation of the processing illustrated in FIG. 6 is similar to a part of the processing illustrated in FIG. 4. Accordingly, the similar processes will be denoted by same Step numbers, and a part of the description thereof is not repeatedly given.

First of all, at Step S12, the control unit 20 turns on a detection operation of the human sensor. When the detection operation of the human sensor is turned on at Step S12, then at Step S50, the control unit 20 determines whether the communication with the base station is being performed. The expression "communication with the base station" represents a state in which the mobile phone communicates with the base station through the above-described location registration, calling-in, calling-out, and the like.

When it is determined that the communication with the base state is being performed (Yes at Step S50), then at Step S52, the control unit 20 saves information on the time during which the communication is performed. In other words, information on the time when high frequency radio waves are transmitted and received in the vicinity of the mobile phone 10 is saved. When it is determined that the communication with the base station is not being performed (No at Step S50) or when the process of Step S52 is performed, then at Step S54, the control unit 20 determines whether the processing is to be ended. When it is determined that the processing is not to be ended (No), the control unit 20 proceeds to Step S50 and determines whether the communication with the base station is being performed. When it is determined that the processing is to be ended (Yes at Step S54), the control unit 20 ends the processing. In the way described above, the control unit 20 stores information on time when the mobile phone 10 has performed communication.

Then, the operation of processing information detected by the human sensor will be described with reference to FIG. 7. A part of the processing operation illustrated in FIG. 7 is similar to the processing illustrated in FIG. 5. Accordingly, similar processes are denoted by same step numbers and a part of the description thereof is not repeatedly given. At Step S40, the control unit 20 determines whether the mobile phone 10 is placed on the charging cradle 40. When it is determined that the mobile phone 10 is not placed on the charging cradle 40 (No at Step S40), the control unit 20 proceeds to Step S40. The control unit 20 repeats the process of Step S40 until the state in which the placement on the charging cradle 40 is detected.

When it is determined that the placement on the charging cradle 40 is detected (Yes at Step S40), then at Step S42, the control unit 20 starts to communicate with the charging cradle 40. When the communication is started at Step S42, then at Step S44, the control unit 20 acquires the detection result of the human sensor 52. The control unit 20 reads the detection result of the human sensor 52 stored in the storage unit 51 of the charging cradle 40. When the detection result is acquired at Step S44, then at Step S60, the control unit 20 invalidates the detection results obtained within a time period during which the communication has been performed, based on the information on the time. When the detection results obtained within the time period during which the communication has been performed is invalidated at Step S60, the control unit 20 detects a movement of a human body at Step S46, outputs the detection result from the communication unit 16 at Step S48, and ends the processing. In other words, the control unit 20 transmits information on whether it is detected that a human body has moved in front of the charging cradle 40, or other information to a predetermined external communication device by the communication performed through a wireless communication path by using the communication unit 16.

As illustrated in FIGS. 6 and 7, the human body detecting system 1 invalidates the detection operation executed via the human sensor 52 within a time period during which the communication with the base station has been performed, based on the communication state of the mobile phone 10, since it is assumed that such a period will be a period of a situation in which a false detection is likely to occur. Thus, the human body detecting system 1 can increase the accuracy of detection of a human body. According to the processing illustrated in FIGS. 6 and 7, the detection by the human sensor 52 is always being executed. As a result, even if the control of the detection operation of the human sensor 52 is not executed, the detection accuracy can be improved.

According to the processing illustrated in FIGS. 6 and 7, the processing can be executed even in the state in which the mobile phone 10 is not placed on the charging cradle 40. As a result, it is possible to exclude a time period during which the detection circuit 72 may be influenced by the radio waves due to the mobile phone 10 which is in the vicinity of the charging cradle 40. The processing illustrated in FIGS. 6 and 7 may be executed only in a state where the mobile phone 10 is set on the charging cradle 40, or may be performed only in a case where a sensor, which is provided to the mobile phone 10 to detect a position relative to the charging cradle 40, detects that the mobile phone 10 is in the vicinity of the charging cradle 40.

In the examples illustrated in FIGS. 4 to 7, the likelihood of the false detection is reduced by detecting the communication state of the communication unit 16 of the mobile phone 10 and by processing the detection result of the human sensor 52 based on the detection result of the communication state. That is, a reduction in false detection is achieved by the control function of the control unit; however, the configuration of reducing the false detection is not limited thereto. Other examples of the processing operation of the human body detecting system 1, that is, other configurations of the false detection reducing unit will be described with reference to FIGS. 8 to 23. In the following examples of the processing operation, similarly to FIGS. 6 and 7, a process of switching the detection operation of the human sensor 52 between ON and OFF states may be replaced with a process of storing information on the time for which the detection operation of the human sensor 52 is to be turned OFF as a period of a situation in which a false detection is likely to occur, and invalidating the detection results obtained during the period of the situation in which a false detection is likely to occur.

Figure 8:
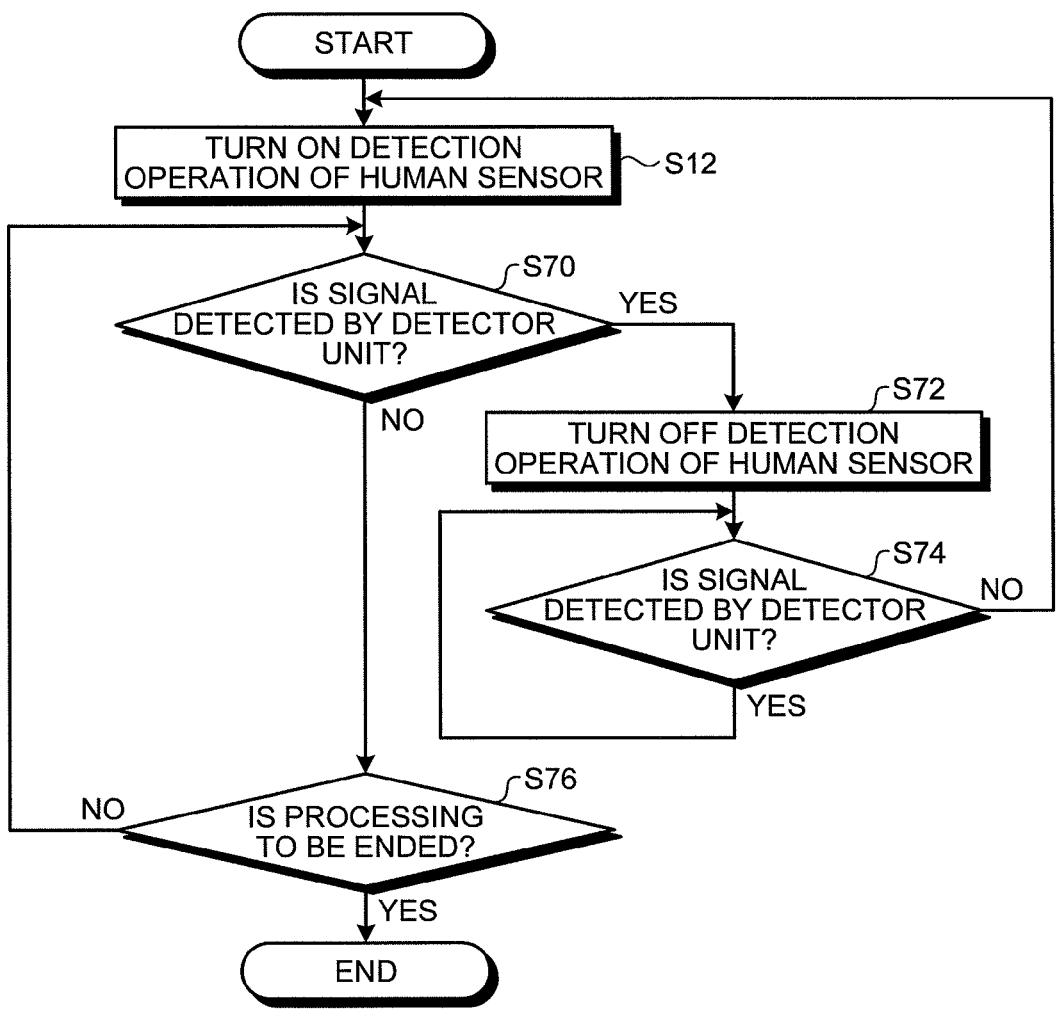
FIG. 8 is a flowchart illustrating another example of operation of the human body detecting system.

Another example of the human body detection operation executed by the human body detecting system 1 will be described with reference to FIG. 8. FIG. 8 is a flowchart illustrating an example of the operation of the human body detecting system. The processing operation illustrated in FIG. 8 uses a detector unit 54 as a part of the false detection reducing unit. Processing procedure illustrated in FIG. 8 is repeatedly executed based on functions provided by the human body detecting program 19B.

First of all, at Step S12, the control unit 20 turns on a detection operation of the human sensor. In other words, the human sensor starts to perform the detection operation of detecting a human body in its surroundings. When the detection operation of the human sensor is turned on at Step S12, then at Step S70, the control unit 20 determines whether a signal is detected by the detector unit 54. The control unit 20 determines that a signal is detected when an output of the detector unit 54 that detects the radio wave (radio wave for communication) is greater than a preset threshold, and determines that the signal has not been detected when the output is not greater than the threshold. The threshold may be determined based on the output at which the false detection may be caused.

When it is determined that the signal is detected (Yes at Step S70), then at Step S72, the control unit 20 turns off the detection operation of the human sensor. When the detection operation is turned off at Step S72, then at Step S74, the control unit 20 determines whether the signal is detected by the detector unit 54. When it is determined that the signal is detected (Yes at Step S74), the control unit 20 proceeds to Step S74. In other words, the control unit 20 repeats the process of Step S74 while the signal is detected. When it is determined that the signal is detected (No at Step S74), the control unit 20 proceeds to Step S12 and turns on the detection operation of the human sensor again.

When, at Step S70, it is determined that the signal is no detected (No at Step S70), then at Step S76, the control unit 20 determines whether the processing is to be ended. When it is determined that the processing is not to be ended (No at Step S76), the control unit 20 proceeds to Step S70 and determines whether the signal is detected by the detector unit 54. When it is determined that the processing is to be ended (Yes at Step S76), the control unit 20 ends the processing. In this way, the control unit 20 switches the detection operation of the human sensor 52 between ON and OFF states.

According to the embodiment, the charging cradle 40 is provided with the detector unit 54, and when a radio wave (the output of a signal greater than a threshold) is detected by the detector unit 54, the human body detecting system 1 determines such a situation to be a situation in which a false detection is likely to occur and stops the detection operation of the human sensor 52 in such a state, thereby increasing the accuracy of detection of a human body. Moreover, even when the radio waves transmitted and received by a mobile communication device other than the mobile phone 10 placed on the charging cradle 40 reaches the charging cradle 40, the human body detecting system 1 can appropriately detect the radio waves by using the result of the detection of the detector unit 54. As a result, the human body detecting system 1 of the embodiment can suppress the occurrence of the false detection due to the radio waves transmitted or received by any mobile communication device, regardless of the type thereof, existing in its surroundings.

Moreover, the human body detecting system 1 of the embodiment can detect the situation in which a false detection is likely to occur with use of the function of the charging cradle 40 alone. As a result, the situation in which a false detection is likely to occur can be appropriately detected even when the charging cradle 40 is not placed on the mobile phone 10.

Figure 9:
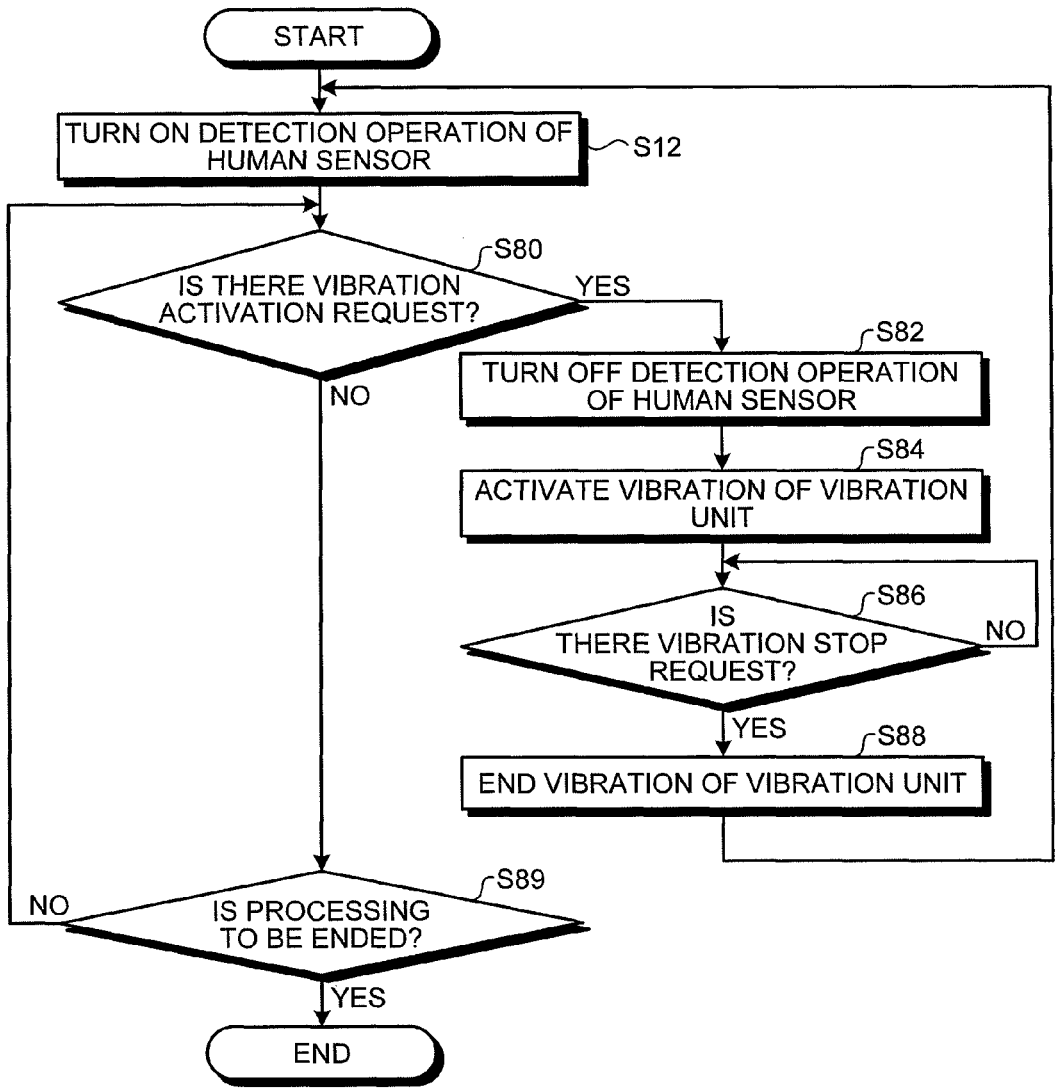
FIG. 9 is a flowchart illustrating another example of operation of the human body detecting system.

Another example of the human body detection operation executed by the human body detecting system 1 will be described with reference to FIG. 9. FIG. 9 is a flowchart illustrating an example of the operation of the human body detecting system. The processing operation illustrated in FIG. 9 uses a function of detecting the operation of the vibration unit as a part of the false detection reducing unit. Processing procedure illustrated in FIG. 9 is repeatedly executed based on functions provided by the human body detecting program 19B.

First of all, at Step S12, the control unit 20 turns on a detection operation of the human sensor. In other words, the detection operation of the human sensor 52 for detecting a human body around the charging cradle 40 is started. When the human sensor detection operation is turned on at Step S12, then at Step S80, the control unit 20 determines whether there is a vibration activation request. The vibration activation request is a request for causing the vibration unit 26 to vibrate the housing 11.

When it is determined that there is the activation request (Yes at Step S80), then at Step S82, the control unit 20 turns off the detection operation of the human sensor. When the detection operation is turned off at Step S82, then at Step S84, the control unit 20 causes the vibration unit 26 to vibrate. In other words, the housing 11 is vibrated by the vibration unit 26. When the vibration is activated at Step S84, then at Step S86, the control unit 20 determines whether there is a vibration stop request. The vibration stop request is a request for stopping the vibration unit 26. For example, when the vibration unit 26 is vibrated by an alarm function, the vibration stop request is output by user's input of a stop manipulation, or the elapse of time which is set. When it is determined that there is no stop request (No at Step S86), the control unit 20 proceeds to Step S86. In other words, the control unit 20 repeats the process of Step S86 until the stop request is detected. When it is determined that there is the stop request (Yes at Step S86), then at Step S88, the control unit 20 stops the vibration of the vibration unit 26, and thereafter proceeds to Step S12 to turn on the detection operation of the human sensor again.

When it is determined that the activation request has not been detected (No at Step S80), then at Step S89, the control unit 20 determines whether the processing is to be ended. When it is determined that the processing is not to be ended (No at Step S89), the control unit 20 proceeds to Step S80 and determines whether there is the vibration activation request. When it is determined that the processing is to be ended (Yes at Step S89), then at Step S89, the control unit 20 ends the processing. In this way, the control unit 20 switches the detection operation of the human sensor between ON and OFF states.

According to the embodiment, the human body detecting system 1 detects the vibration state of the vibration unit 26, and stops the detection operation of the human sensor 52 for a period during which the vibration unit 26 is vibrating since it is assumed that such a period will be a period of a situation in which a false detection is likely to occur. Thus, the human body detecting system 1 can increase the accuracy of detection of a human body. Specifically, the human body detecting system 1 determines the period during which the vibration unit 26 is vibrating to be the situation in which a false detection is likely to occur, and does not perform measurement in a state in which the accuracy of detection is low due to the vibration of the infrared sensor 70 caused by the vibration of the vibration unit 26. Therefore, the human body detecting system 1 can reduce the likelihood of the occurrence of the false detection. If the measurement is performed during the vibration, a relative position of the human sensor with respect to a stationary object is changed. Therefore, the human sensor 52 might falsely detect the shift of the stationary object as a movement of a human body. However, the human body detecting system 1 of the embodiment can suppress the occurrence of the false detection because the human body detecting system 1 does not detect a human body in such a state.

Although the human body detecting system 1 of the embodiment makes a determination based on the control state of the vibration unit 26, such a process may be performed based on the detection result of the acceleration sensor 55 of the charging cradle 40. In that case, movements and/or vibrations of other components besides the vibration of the vibration unit 26 of the mobile phone 10 also can be detected. As a result, the false detections occurring due to the movement and/or vibration of the charging cradle 40 caused by various kinds of factors can be suppressed. Moreover, when the detection result of the acceleration sensor 55 is used, the situation in which a false detection is likely to occur can be detected by the function of the charging cradle 40 alone. As a result, the situation in which a false detection is likely to occur is appropriately detected even when the charging cradle 40 is not placed on the mobile phone 10.

Figure 10:
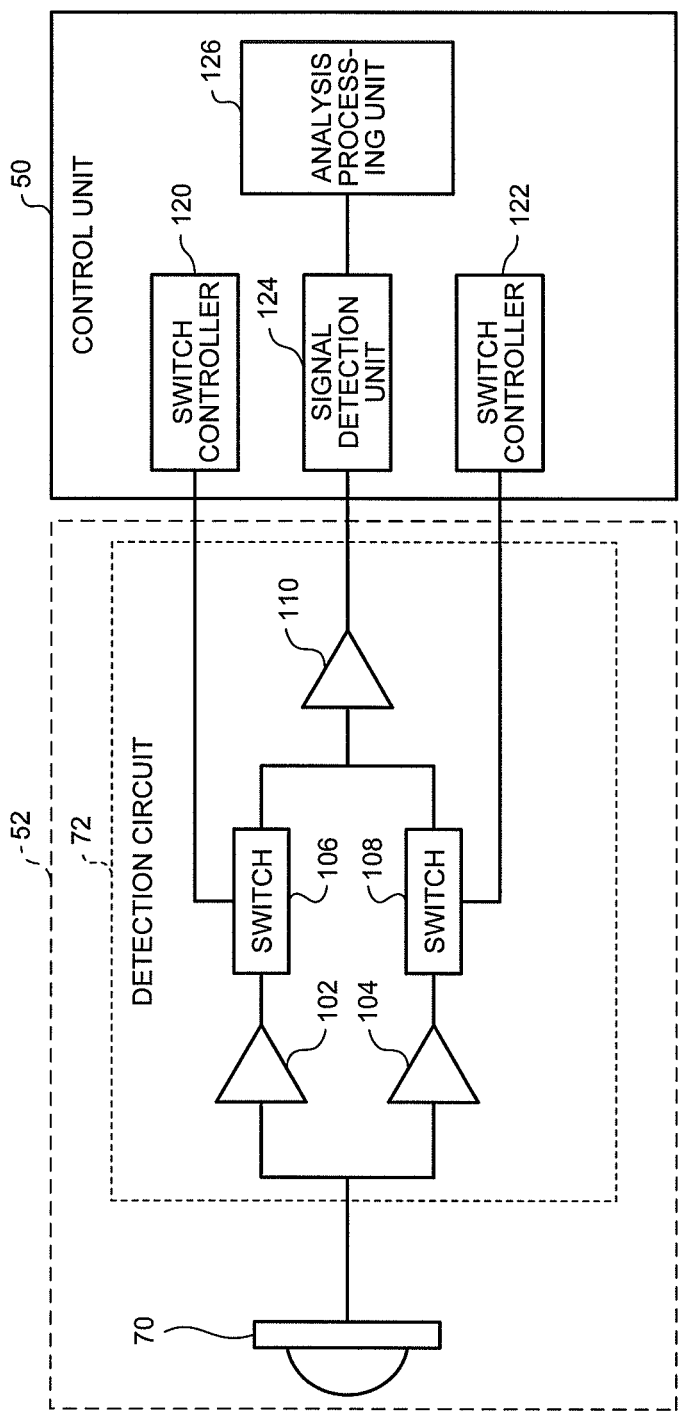
FIG. 10 is a block diagram illustrating a schematic configuration of a part of functions of a charging cradle of the human body detecting system.
Figure 11:
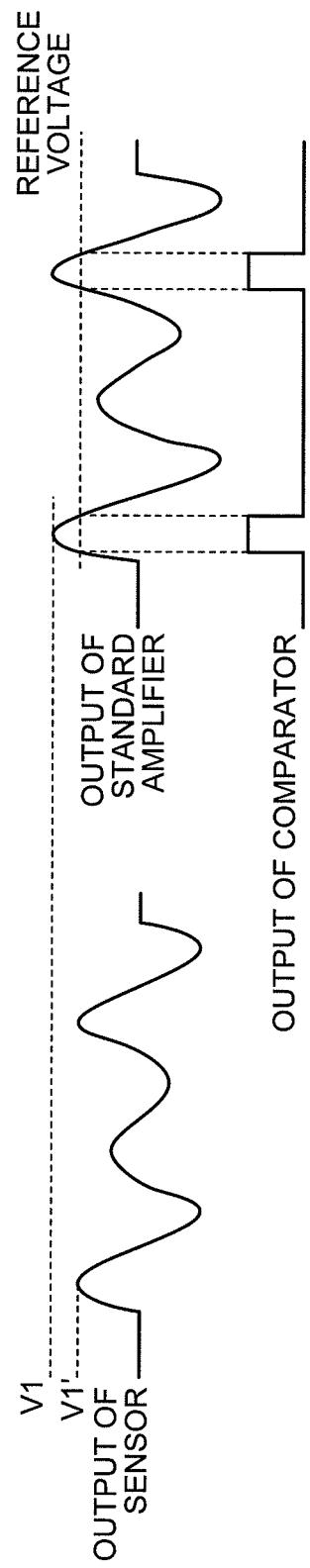
FIGS. 11 and 12 are explanatory diagrams to describe an operation of the human body detecting system.
Figure 12:
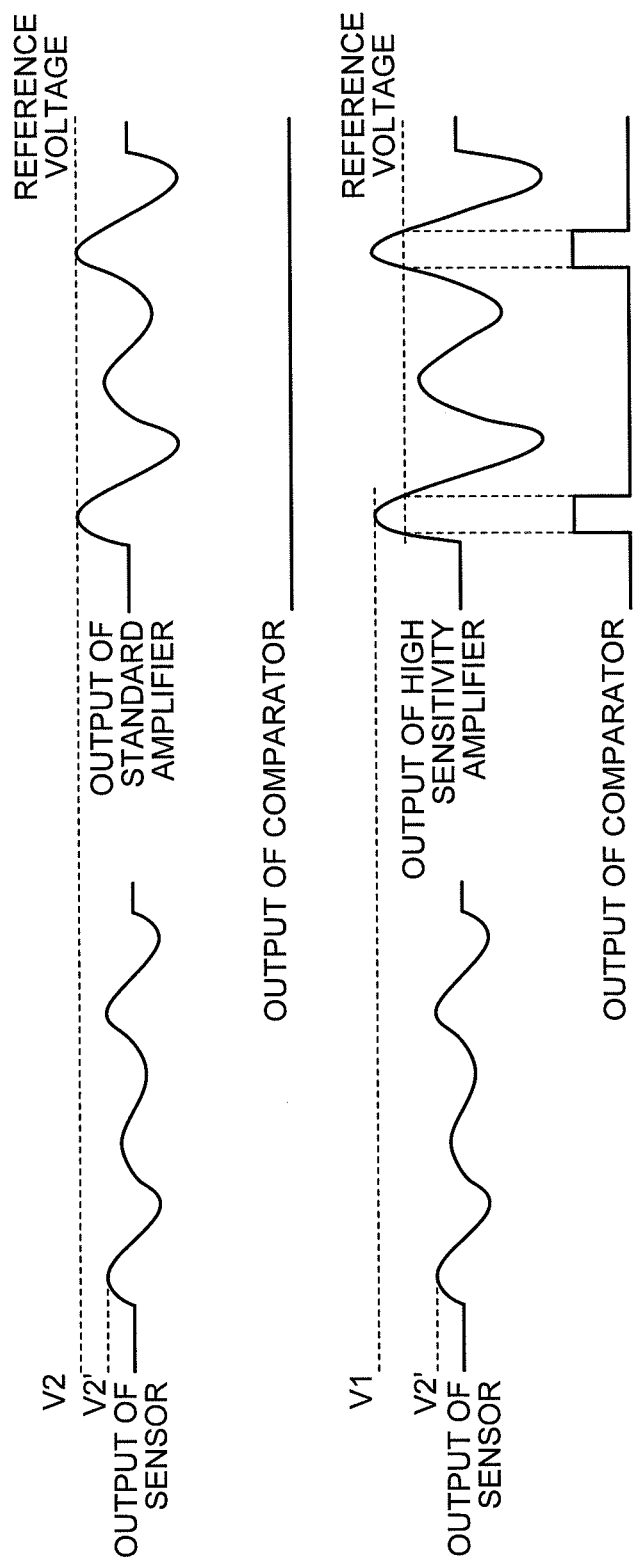

The human body detecting system 1 may be configured to adjust a detection sensitivity of the human sensor 52. FIG. 10 is a block diagram illustrating a schematic configuration of a part of functions of the charging cradle of the human body detecting system. FIGS. 11 and 12 are each explanatory diagrams to describe operation of the human body detecting system. FIG. 10 illustrates a modification of the control unit 50 and the human sensor 52 of the charging cradle 40. The detection circuit 72 of the human sensor 52 illustrated in FIG. 10 includes a standard amplifier 102, a high sensitivity amplifier 104, switches 106 and 108, and a comparator 110.

The standard amplifier 102 is an amplifier to amplify a signal detected by the infrared sensor 70. The standard amplifier 102 amplifies a signal of signal intensity within a range corresponding to a range of a temperature over and under a predetermined reference temperature by an amplification degree. The high sensitivity amplifier 104 is an amplifier to amplify the signal detected by the infrared sensor 70. The high sensitivity amplifier 104 amplifies a signal of signal intensity within a range corresponding to a range of a temperature over and under a predetermined reference temperature by an amplification degree. The reference temperature of the high sensitivity amplifier 104 is substantially the same as that of the standard amplifier 102, while the high sensitivity amplifier 104 amplifies a signal by a greater amplification degree than that of the standard amplifier 102. The switch 106 is an element disposed between the standard amplifier 102 and the comparator 110, and switches between a state in which the standard amplifier 102 and the comparator 110 are connected to each other and a state in which the standard amplifier 102 and the comparator 110 are disconnected from each other. The switch 108 is an element disposed between the high sensitivity amplifier 104 and the comparator 110, and switches between a state in which the high sensitivity amplifier 104 and the comparator 110 are connected to each other and a state in which the high sensitivity amplifier 104 and the comparator 110 are disconnected from each other. The comparator 110 is a circuit that performs analogue-to-digital conversion on the signal by using a voltage width of a predetermined range. The comparator 110 converts an analog signal that has passed through the switch 106 or the switch 108 into a digital signal and transmits the digital signal to the control unit 50.

The detection circuit 72 has the above-described configuration, and thus can detects the temperature with different detection sensitivities by switching between two amplifiers, the standard amplifier 102 and the high sensitivity amplifier 104, which detects respectively different temperature ranges within a voltage range in which the comparator 110 can be used. The standard amplifier 102 of the embodiment is an amplifier that amplifies the range of 36±20° C. within the voltage range in which the comparator 110 can be used, while the high sensitivity amplifier 104 of the embodiment is an amplifier that amplifies the range of 36±4° C. within the voltage range in which the comparator 110 can be used.

The control unit 50 includes switch controllers 120 and 122, a signal detection unit 124, and an analysis processing unit 126. The switch controller 120 switches the switch 106, which is disposed between the standard amplifier 102 and the comparator 110, between connection and disconnection. As a result, the switch controller 120 switches whether or not the signal amplified by the standard amplifier 102 is input to the comparator 110. The switch controller 122 switches the switch 108, which is disposed between the high sensitivity amplifier 104 and the comparator 110, between connection and disconnection. As a result, the switch controller 122 switches whether or not the signal amplified by the high sensitivity amplifier 104 is input to the comparator 110. The signal detection unit 124 receives the signal converted by the comparator 110. The signal detection unit 124 transmits the detected signal to the analysis processing unit 126. The analysis processing unit 126 processes the detected signal based on the setting, and then stores the processed signal in the storage unit 51.

With such a configuration, the detection circuit 72 illustrated in FIG. 10 switches the amplifiers to be used depending on a difference in temperatures between measurement areas, so that temperature range in which the temperatures of detection areas are detected can be changed using the same comparator 110.

For example, when the ambient temperature is a normal temperature and a human body is moving, as illustrated in FIG. 11, since difference in temperatures between the human body and the surroundings is relatively large, the infrared sensor 70 detects temperatures to generate an output with large amplitude. In this case, the standard amplifier 102 can amplify the output so that a difference in output between an area corresponding to the human body and the other areas can be sufficiently increased; thereby, the area corresponding to the human body can be detected by the comparator 110. Meanwhile, when the ambient temperature is high and a human body is moving, as illustrate in FIG. 12, the infrared sensor 70 detects temperatures to generate an output with small amplitude because a different in temperature between the human body and the surroundings is relatively small. In other words, when the ambient temperature is a high temperature, the amplitude of the output is small compared to when the ambient temperature is a normal temperature. In this case, when the output is amplified by the standard amplifier 102, a difference in output between the area corresponding to the human body and the other areas is small. Therefore, the area corresponding to the human body may not be detected by the comparator 110. Contrarily, when the output is amplified by the high sensitivity amplifier 104, a difference in output between the area corresponding to the human body and the other areas can be increased. Therefore, the area corresponding to the human body can be detected by the comparator 110. In spite of its narrow temperature range to be detected, the high sensitivity amplifier 104 can appropriately amplify the output in a case where the ambient temperature is high since a difference in temperature between the human body and the surroundings is small.

Figure 13:
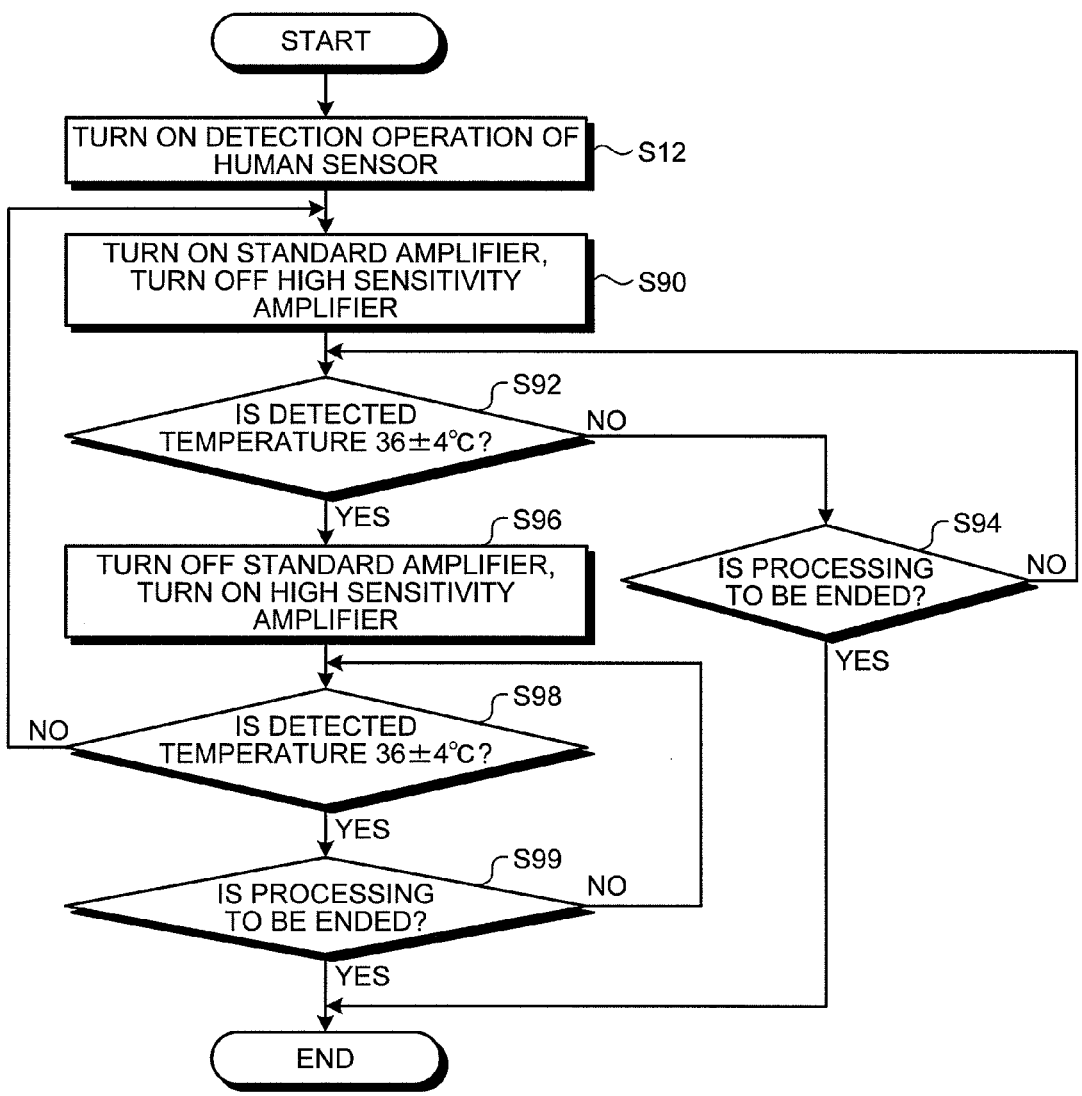
FIG. 13 is a flowchart illustrating another example of operation of the human body detecting system.

Then, an operation in which the control unit 50 controls the human sensor 52, more specifically, a switching operation between the amplifiers used will be described. The embodiment is in connection with a case in which the control unit 20 executes the processing of the human sensor 52 through the control unit 50; however, as described above, the processing can be executed by the control unit 50. FIG. 13 is a flowchart illustrating another example of the operation of the human body detecting system. Processing procedure illustrated in FIG. 13 is repeatedly executed based on functions provided by the human body detecting program 19B.

First of all, at Step S12, the control unit 20 turns on a detection operation of the human sensor. In other words, the detection operation of the human sensor 52 for detecting a human body around the charging cradle 40 is started. When the detection operation of the human sensor is turned on at Step S12, then at Step S90, the control unit 20 controls the detection circuit 72 so that the standard amplifier 102 is turned on and the high sensitivity amplifier 104 is turned off. When the amplifier to be used is set at Step S90, then at Step S92, the control unit 20 determines whether a detected temperature is 36±4° C., that is, whether the detected temperature is between 32° C. and 40° C. The detected temperature is a temperature calculated based on the detection result of the human sensor 52. The detected temperature can use values detected by various methods. For example, an average value of temperatures measured at a predetermined number of points within detection areas may be used as the detected temperature, or a value calculated from the temperature distribution and area ratios within the detection areas may be used as the detected temperature. When it is determined that the detected temperature is not 36±4° C. (No at Step S92), then at Step S94, the control unit 20 determines whether the processing is to be ended. When it is determined that the processing is not to be ended (No at Step S94), the control unit 20 proceeds to Step S92. When it is determined that the processing is to be ended (Yes at Step S94), the control unit 20 ends the processing.

When it is determined that the detected temperature is 36±4° C. at Step S92, then at Step S96, the control unit 20 controls the detection circuit 72 so that the standard amplifier 102 is turned off and the high sensitivity amplifier 104 is turned on. When the amplifier to be used is set at Step S96, then at Step S98, the control unit 20 determines whether the detected temperature is 36±4° C., that is, whether the detected temperature is between 32° C. and 40° C. When it is determined that the detected temperature is not 36±4° C. (No at Step S98), the control unit 20 proceeds to Step S90 and switches the amplifier to be used. When it is determined that the detected temperature is 36±4° C. (Yes at Step S98), then at Step S99, the control unit 20 determines whether the processing is to be ended. When it is determined that the processing is not to be ended (No at Step S99), the control unit 20 proceeds to Step S98. When it is determined that the processing is to be ended (Yes at Step S99), the control unit 20 ends the processing.

The human body detecting system 1 switches the amplifier to be used based on the detected temperature so that a human body can be detected with high accuracy. As a result, even when the ambient temperature is high and a difference in temperature between the human body and the surroundings is small, the human body can be detected with high accuracy. Specifically, when the ambient temperature is high, the amplifier to be used is switched to the high sensitivity amplifier 104. Therefore, even when a detected output voltage of the infrared sensor 70 has a small value, it is largely amplified so as to be able to be detected by the comparator 110. In other words, a threshold of the detected output voltage of the infrared sensor 70 is lowered. As a result, even when a difference in temperature between the surroundings and the human body is small, the human body can be detected. Moreover, the processing illustrated in FIG. 13 can be performed with the charging cradle alone in a way that the control unit 50 executes the processing. As a result, even when the mobile phone 10 is not placed on the charging cradle 40, the processing can be performed.

Figure 14:
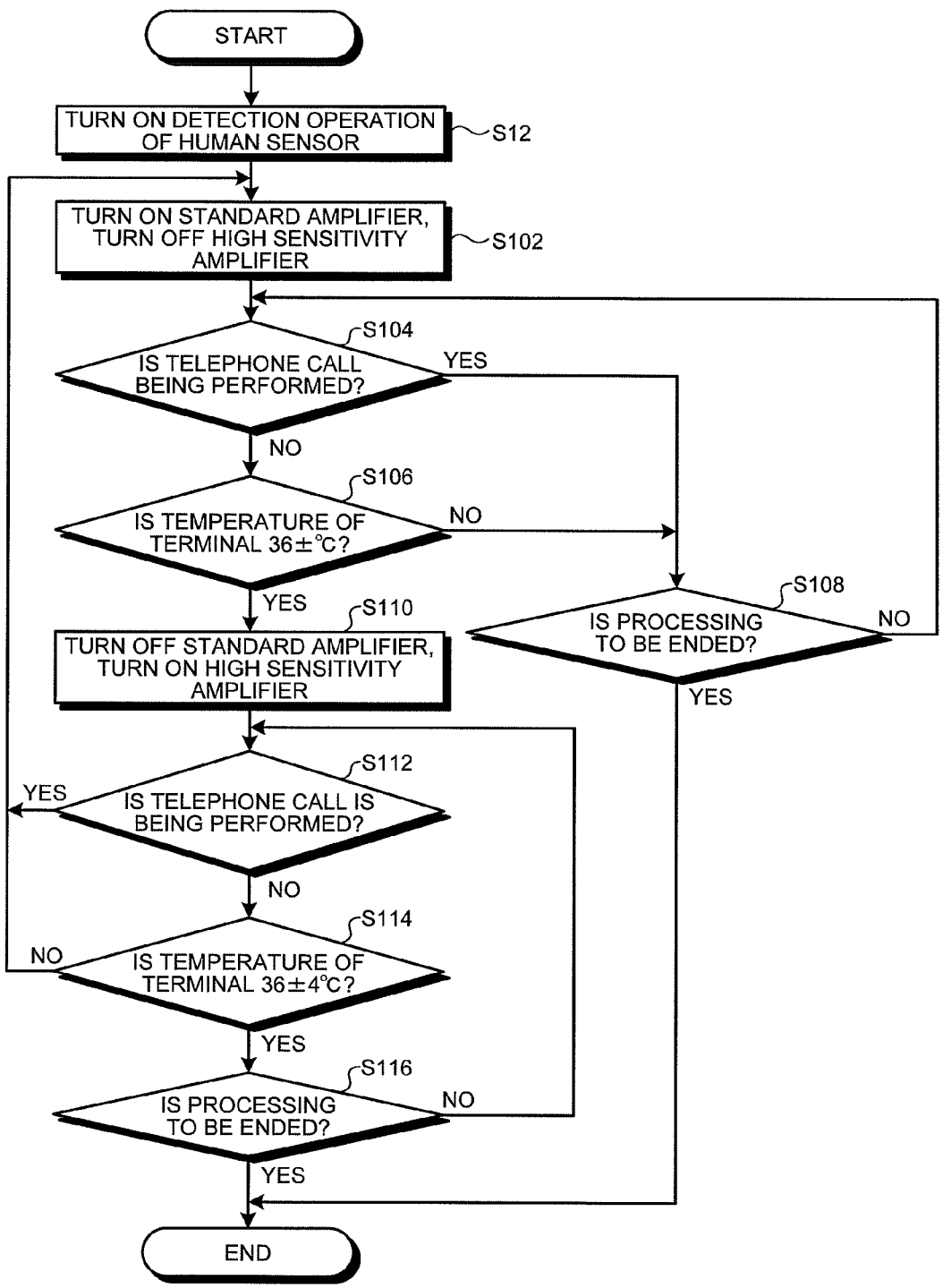
FIG. 14 is a flowchart illustrating another example of operation of the human body detecting system.

Then, another example of the control operation of the control unit 50 for controlling the human sensor 52, specifically an operation of switching between the amplifiers to be used, will be described. FIG. 14 is a flowchart illustrating another example of the operation of the human body detecting system. Processing procedure illustrated in FIG. 14 is repeatedly executed based on functions provided by the human body detecting program 19B.

First of all, at Step S12, the control unit 20 turns on a detection operation of the human sensor. In other words, the detection operation of the human sensor 52 for detecting the human body around the charging cradle 40 is started. When the detection operation of human sensor is turned on at Step S12, then at Step S102, the control circuit 20 controls the detection circuit 72 so that the standard amplifier 102 is turned on and the high sensitivity amplifier 104 is turned off. When the amplifier to be used is set at Step S102, then at Step S104, the control unit 20 determines whether a telephone call is being performed. When it is determined that a telephone call is being performed (Yes at Step S104), the control unit 20 proceeds to Step S108. When a telephone call is not being performed (No at Step S104), that is, when a state other than the telephone call state is determined, then at Step S106, the control unit 20 determines whether the temperature of a terminal is 36±4° C., that is, whether the temperature of the terminal is between 32° C. and 40° C. The temperature of the terminal is a temperature calculated based on the detection result of the temperature sensor 28. As for the temperature of the terminal, values detected by various methods can be used. For example, the detection result of the temperature sensor 28 may be used as the temperature of the terminal as it is, or the value calculated from the detection result of the temperature sensor 28 through an operation which is set in advance may be used as the temperature of the terminal. When it is determined that the temperature of the terminals is not 36±4° C. (No at Step S106), the control unit 20 proceeds to Step S108. When a positive determination (Yes) is made at Step S104 or a negative determination (No) is made at Step S106, then at Step S108, the control unit 20 determines whether the processing is to be ended. When it is determined that the processing is not to be ended (No at Step S108), the control unit 20 proceeds to Step S104. When it is determined that the processing is to be ended (Yes at Step S108), the control unit 20 ends the processing.

When it is determined that the temperature of the terminal is 36±4° C. at Step S106, then at Step S110, the control unit 20 controls the detection circuit 72 so that the standard amplifier 102 is turned off and the high sensitivity amplifier 104 is turned on. When the amplifier to be used is set at Step S110, then at Step S112, the control unit 20 determines whether a telephone call is being performed. When a positive determination (Yes) is made at Step S112, the control unit 20 proceeds to Step S102. When it is determined that a telephone call is not being performed (No at Step S112), that is, when a state other than the telephone call state is determined, then at Step S114, the control unit 20 determines whether the temperature of the terminal is 36±4° C., that is, whether the temperature of the terminal is between 32° C. and 40° C. When it is determined that the temperature of the terminal is not 36±4° C. (No at Step S114), the control unit 20 proceeds to Step S102 and switches the amplifier to be used. When it is determined that the temperature of the terminal is 36±4° C. (Yes at Step S114), then at Step S116, the control unit 20 determines whether the processing is to be ended. When it is determined that the processing is not to be ended (No at Step S116), the control unit 20 proceeds to Step S112. When it is determined that the processing is to be ended (Yes at Step S116), the control unit 20 ends the processing.

The human body detecting system 1 switches the amplifiers to be used based the temperature of the terminal so that a human body can be detected with high accuracy. As a result, a human body can be detected with high accuracy even when the ambient temperature is high and a difference in temperature between a human body and the surroundings is small.

Figure 15:
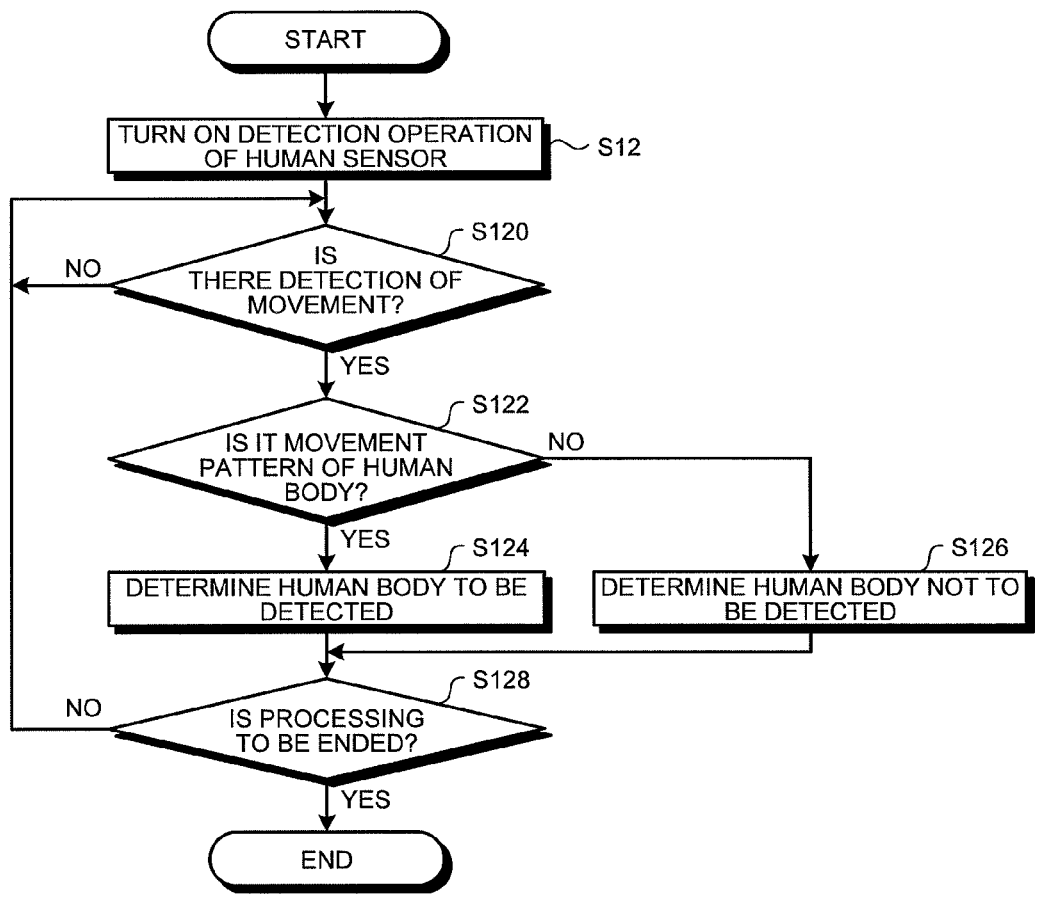
FIG. 15 is a flowchart illustrating another example of operation of the human body detecting system.
Figure 16:
FIG. 16 is an explanatory diagram to describe the operation of the human body detecting system.

Then, an example of the control operation of the control unit 50 for controlling the human sensor 52, specifically an example of the control operation for a case where the detection result is analyzed and the determination is made based thereon will be described with reference to FIGS. 15 and 16. FIG. 15 is a flowchart illustrating another example of the operation of the human body detecting system. FIG. 16 is an explanatory diagram to describe the operation of the human body detecting system. Processing procedure illustrated in FIG. 15 is repeatedly executed based on functions provided by the human body detecting program 19B.

First of all, at Step S12, the control unit 20 turns on a detection operation of the human sensor. In other words, the detection operation of the human sensor 52 for detecting a human body around the charging cradle 40 is started. When the detection operation of the human sensor is turned on at Step S12, the control unit 20 determines whether a movement is detected at Step S120. In other words, the control unit 20 analyzes the detection result of the human sensor 52, and determines whether an object which is moving is detected. In order to reduce the load of detection and increase the detection efficiency, the object as a detection target may be an object having a detection area of a predetermined size.

When it is determined that there is no detected movement (No at Step S120), that is, when an object which is moving is not detected, the control unit 20 proceeds to Step S120. In other words, the control unit 20 repeats the process of Step S120 until the movement of an object is detected. The control unit 20 may proceed to Step S128 when the determination that a movement is not detected is continuously repeated a predetermined number of times.

When it is determined that a movement is detected (Yes at Step S120), then at Step S122, the control unit 20 determines whether the movement corresponds to a movement pattern of a human body. The term "movement pattern of a human body" represents any one of movement patterns which are detected by experiments and the like in advance and stored in the storage unit 19 or the storage unit 51. The movement pattern may be stored as a pattern of changes in output where the axis of abscissas indicates time as illustrated in FIG. 16 for example. The control unit 20 determines whether the detected movement corresponds to the movement pattern of a human body by comparing various kinds of movement patterns stored in the storage unit 19 or the storage unit 51 with the detected movement.

When it is determined that the detected movement corresponds to the movement pattern of a human body (Yes at Step S122), then at Step S124, the control unit 20 determines that a human body is detected. Then the control unit 20 proceeds to Step S128. When the detected movement does not correspond to the movement pattern of a human body (No at Step S122), then at Step S126, the control unit 20 determines that a human body is not detected. Then, the control unit 20 proceeds to Step S128.

When the process of Step S124 or Step S126 is executed, then at step S128, the control unit 20 determines whether the processing is to be ended. When it is determined that the processing is not to be ended (No at Step S128), the control unit 20 proceeds to Step S120. When it is determined that the processing is to be ended (Yes at Step S128), the control unit 20 ends the processing.

Thus, the human body detecting system 1 determines whether the detected movement is human body's movement by using movement patterns which are preset; therefore a human body can be detected with high accuracy. Moreover, it is possible to appropriately determine the detected object not to be a human body when the movement, which cannot be made by a human body, is detected.

Figure 17:
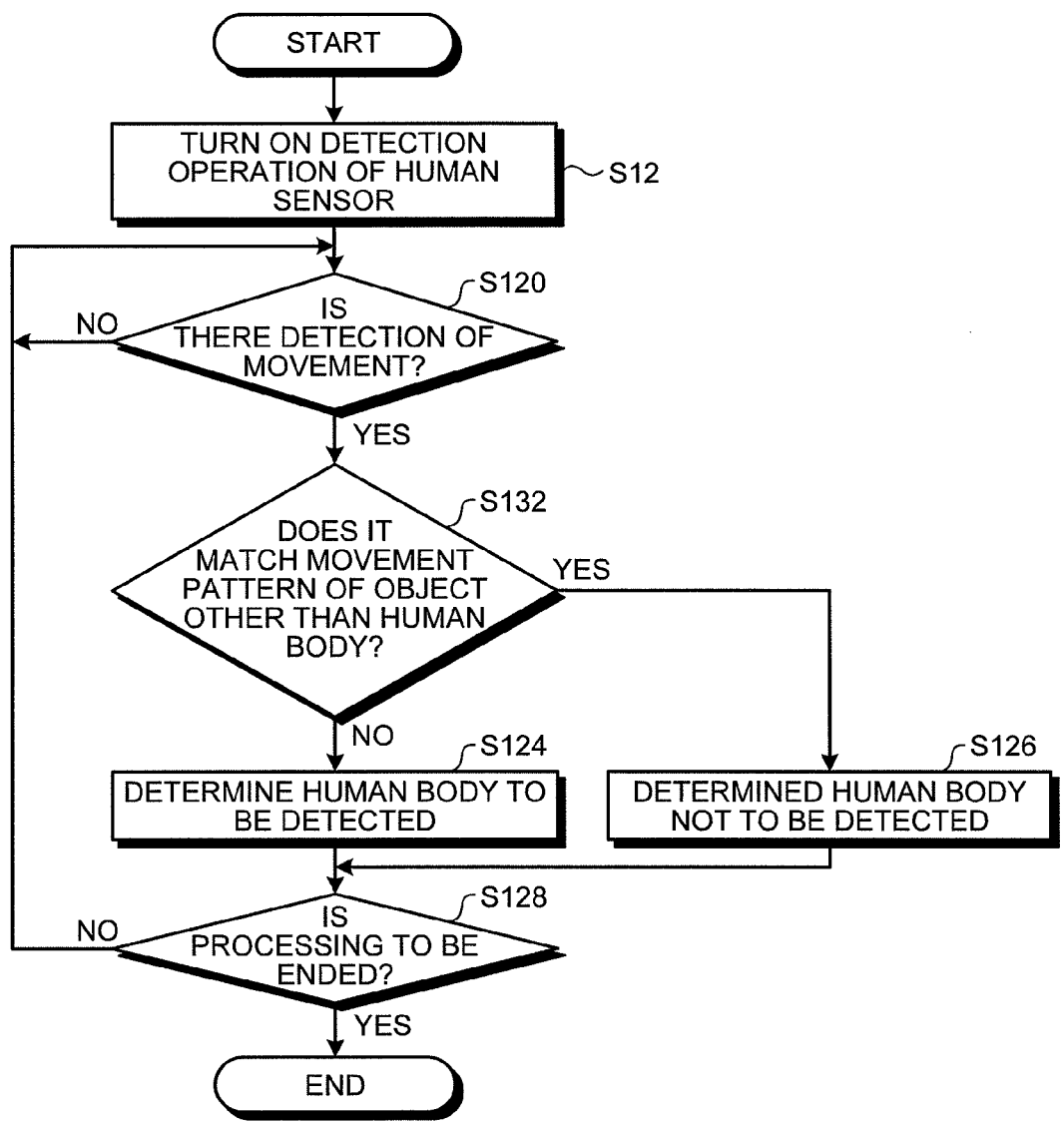
FIG. 17 is a flowchart illustrating another example of operation of the human body detecting system.
Figure 18A:
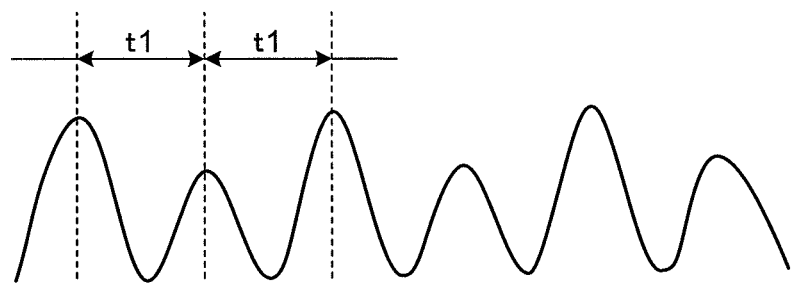
FIGS. 18A to 18C are explanatory diagrams to describe the operation of the human body detecting system; operation of the human body detecting system.
Figure 18B:
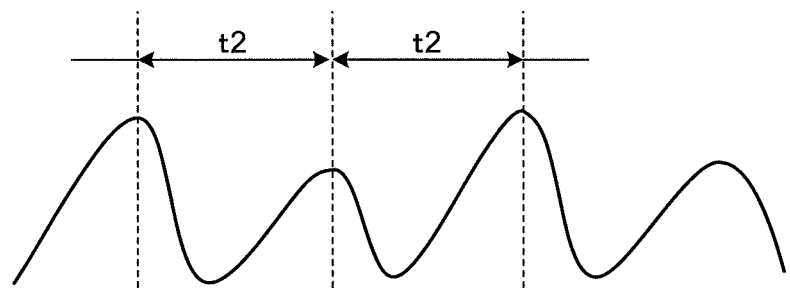
Figure 18C:
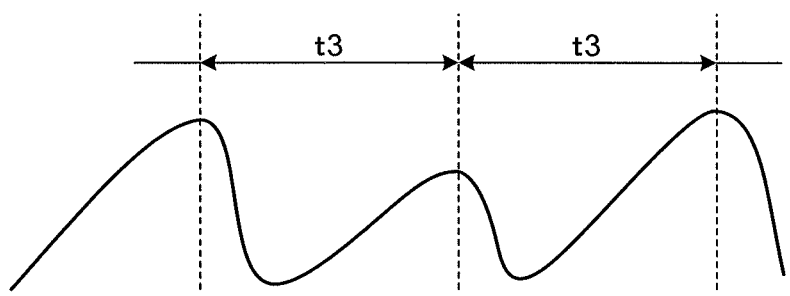

Then, another example of the control operation of the control unit 50 for controlling the human sensor 52, specifically another example of the control operation for a case where the detection result is analyzed and the determination is made based thereon will be described with reference to FIGS. 17 and 18. FIG. 17 is a flowchart illustrating another example of an operation of the human body detecting system. FIGS. 18A to 18C are respectively explanatory diagrams to describe the operation of the human body detecting system. Processing procedure illustrated in FIG. 17 is repeatedly executed based on functions provided by the human body detecting program 19B. Among the processes illustrated in FIG. 17, the same processes as those illustrated in FIG. 15 are denoted by same step numbers.

First of all, at Step S12, the control unit 20 turns on a detection operation of the human sensor. In other words, the detection operation of the human sensor 52 for detecting a human body around the charging cradle 40 is started. When the detection operation of the human sensor is turned on at Step S12, then at Step S120, the control unit 20 determines whether a movement is detected.

When it is determined that there is no detected movement (No at Step S120), that is, when an object which is moving is not detected, the control unit 20 proceeds to Step S120. In other words, the control unit 20 repeats the process of Step S120 until a movement of an object is detected.

When it is determined that a movement is detected (Yes at Step S120), then at Step S132, the control unit 20 determines whether the detected movement matches a movement pattern of an object other than a human body.

When it is determined that the detected movement does not correspond to a movement pattern of an object other than a human body (No at Step S132), then at Step S124, the control unit 20 determines that a human body is detected and proceeds to Step S128. When it is determined that the detected movement corresponds to a movement pattern of an object other than a human body (Yes at Step S132), then at Step S126, the control unit 20 determines that a human body is not detected and proceeds to Step S128.

When the process of Step S124 or Step S126 is executed, then at Step S128, the control unit 20 determines whether the processing is to be ended. When it is determined that the processing is not to be ended (No at Step S128), the control unit 20 proceeds to Step S120. When it is determined that the processing is to be ended (Yes at Step S128), the control unit 20 ends the processing.

In this way, the human body detecting system 1 determines whether the detected movement corresponds to a movement pattern of an object other than a human body to determine whether the detected movement is human body's movement; therefore the likelihood that a movement of an object other than a human body is detected as human body's movement is reduced, and thus a human body can be detected with high accuracy.

For the determination on whether it is a movement pattern of an object other than a human body at Step S132, various methods can be used. For example, the control unit 20 may determine whether the detected movement is a cyclic movement. A movement pattern of an object other than a human body, especially, a movement of an object due to natural phenomena such as fluctuation, may approximate to cyclic movement patterns as illustrated in FIGS. 18A to 18C. Specifically, the movement pattern of FIG. 18A has a cycle of t1, the movement pattern of FIG. 18B has a cycle of t2, and the movement pattern of FIG. 18C has a cycle of t3.

The control unit 20 may determine whether a movement of a detected object is a cyclic movement, specifically, whether the movement of the detected object is a movement cyclically repeated on a cycle within a threshold range, and may determine the detected movement to be a movement pattern of an object other than a human body when the detected movement has the cyclic movement. In this way, when the detected movement is a cyclic movement, the movement is regarded as a movement of an object other than a human body. As a result, it is possible to reduce the likelihood that the movement caused by various kinds of natural phenomena is detected as human body's movement. An example of the movement of the object caused by natural phenomena is a case where an object (for example, a piece of laundry or a foliage plant) other than a human moves in front of a window into which direct rays of the sun stream. In this case, since the object, which is not a human, moves by the wind from the outside, the wind from a fan, or the like, it moves somewhat cyclically.

Figure 19:
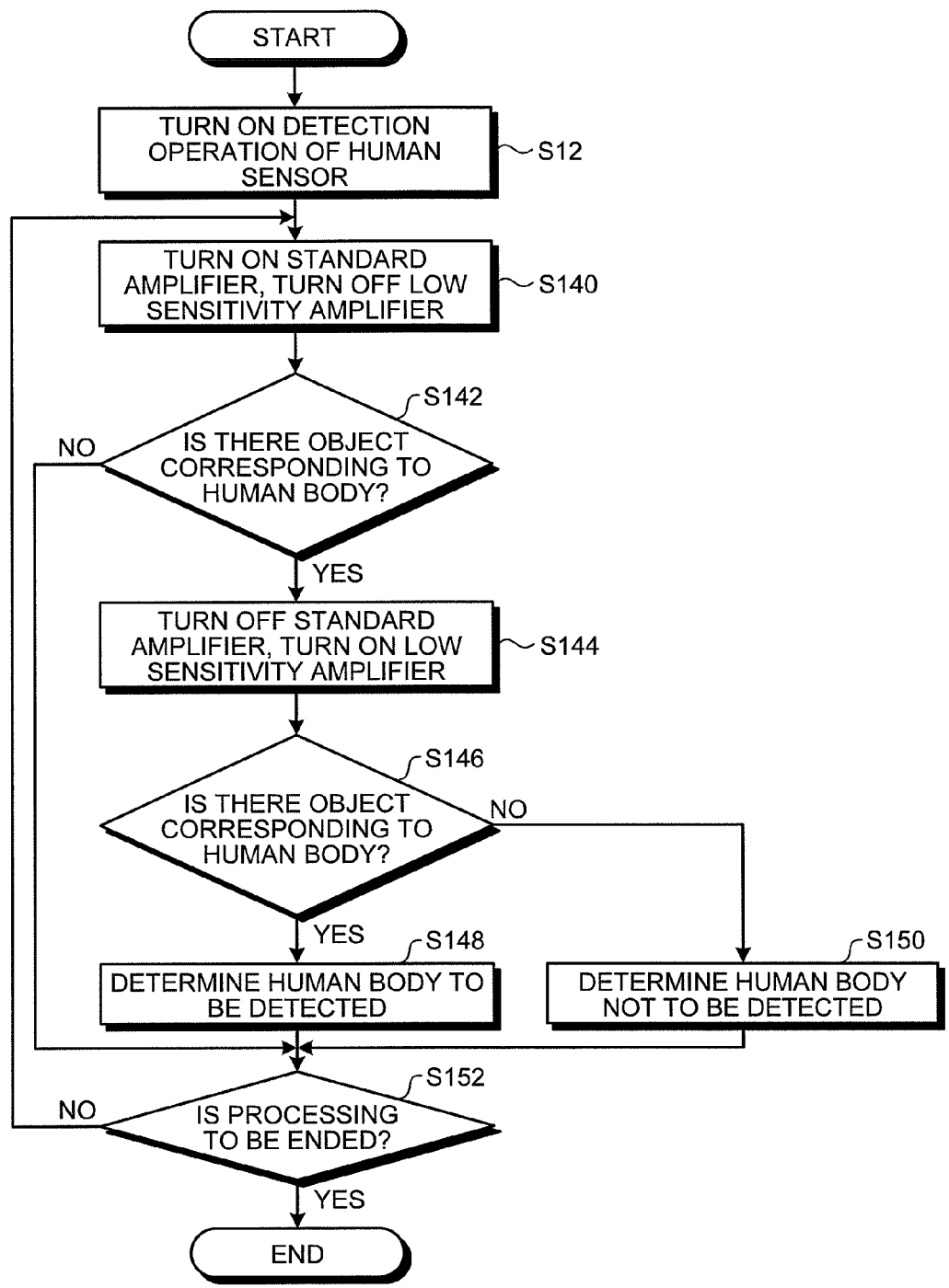
FIG. 19 is a flowchart illustrating another example of operation of the human body detecting system.
Figure 20:
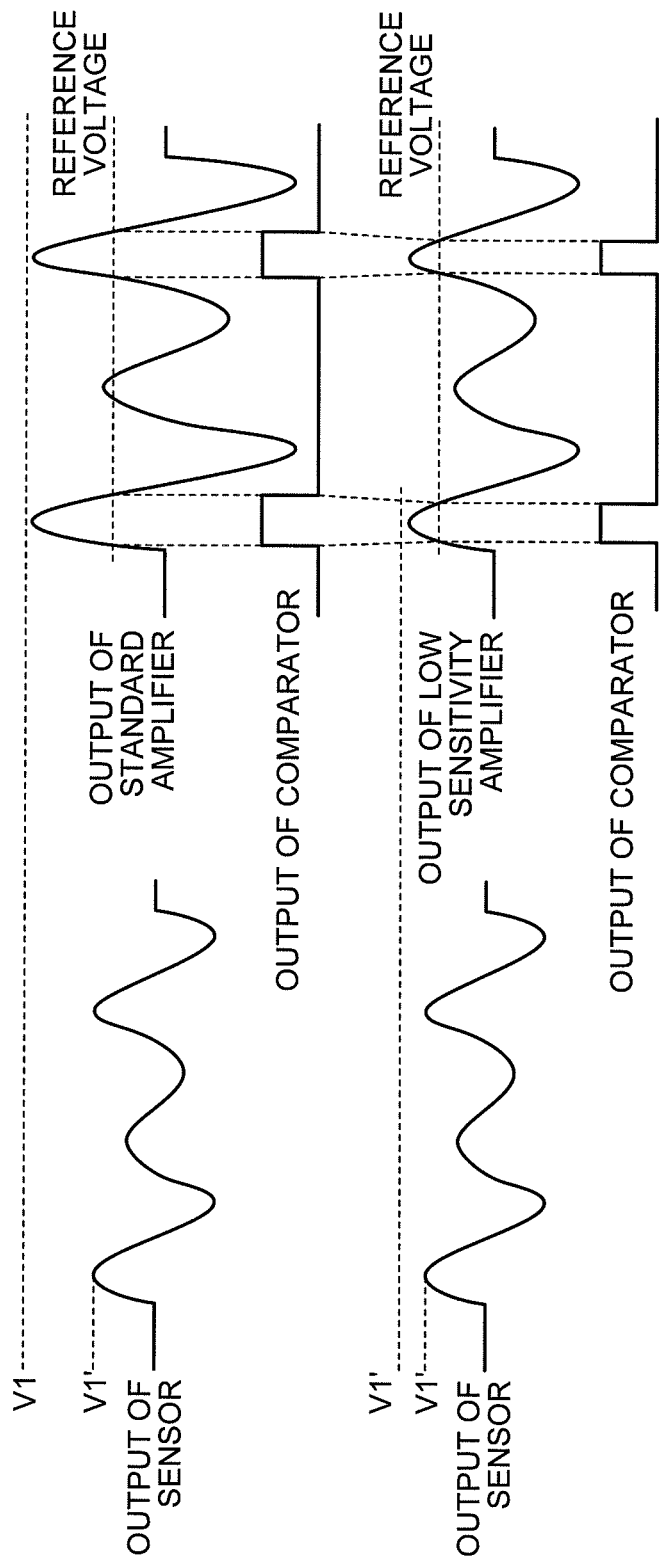
FIGS. 20 and 21 are explanatory diagrams to describe the operation of the human body detecting system.
Figure 21:
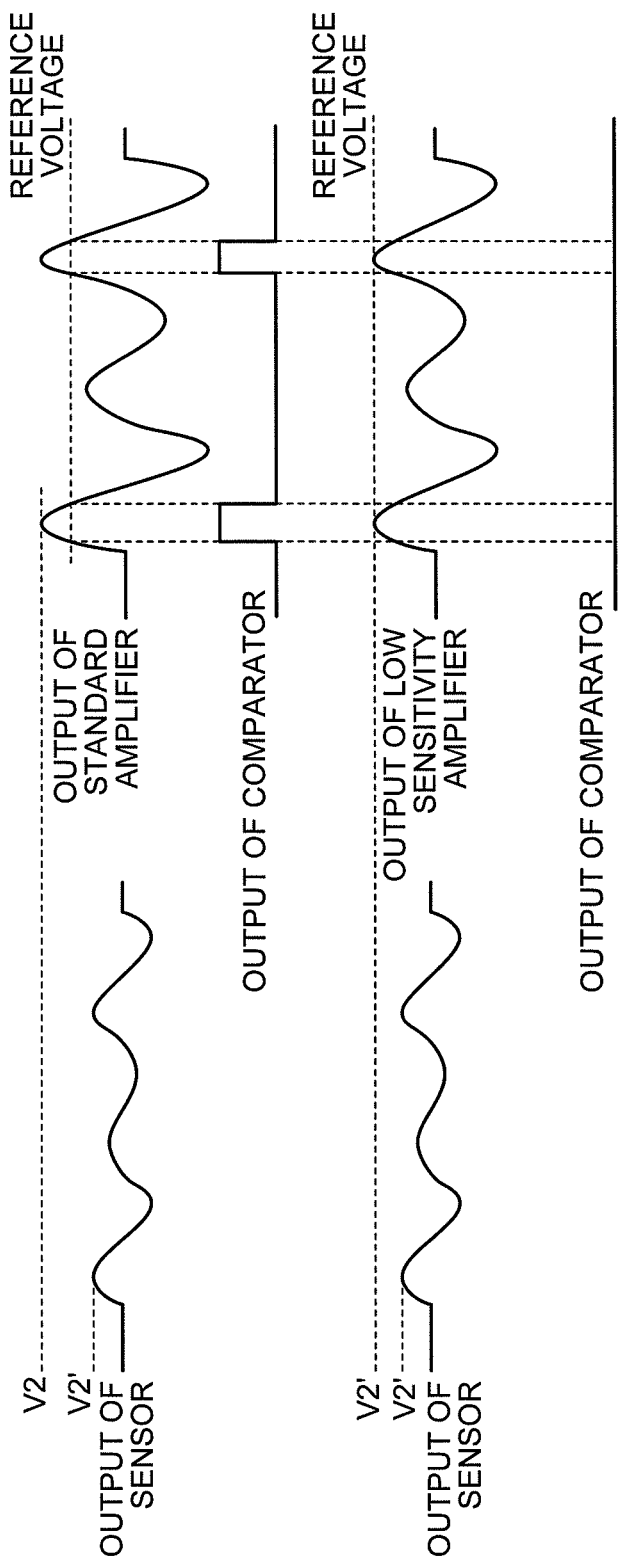

Then, the control operation of the control unit 50 for controlling the human sensor 52, specifically, another example of the control operation for a case where detection results are analyzed and determinations are made based thereon will be described with reference to FIGS. 19 to 21. FIG. 19 is a flowchart illustrating another example of the operation of the human body detecting system. FIGS. 20 and 21 are explanatory diagrams to describe the operation of the human body detecting system. Processing procedure illustrated in FIG. 19 is repeatedly executed based on functions provided by the human body detecting program 19B. Moreover, two amplifiers including a standard amplifier and a low sensitivity amplifier with a lower sensitivity than the standard amplifier are used as the amplifiers of the detection circuit 72 for the processing operations illustrated in FIGS. 19 to 21. A switching mechanism in this example is similar to the above-described case.

First of all, at Step S12, the control unit 20 turns on a detection operation of the human sensor. In other words, the detection operation of the human sensor 52 which detects a human body around the charging cradle 40 is started. When the detection operation of the human sensor is turned on at Step S12, then at Step S140, the standard amplifier is turned on and the low sensitivity amplifier is turned off. In other words, the amplifier used for detection is set to the standard amplifier. When the detection circuit is set at Step S140, then at Step S142, the control unit 20 determines whether there is an object corresponding to a human body. In other words, the control unit 20 analyzes the detection result of the human sensor 52 to determine whether there is an object corresponding to a human body. Specifically, the control unit 20 determines that there is an object corresponding to a human body when there is an object which satisfies the detection criterion used to determine the detected object to be a human body, at Step S142.

When it is determined that there is no object corresponding to human body (No at Step S142), the control unit 20 proceeds to Step S152. When it is determined that there is an object corresponding to a human body (Yes at Step S142), then at Step S144, the control unit 20 turns off the standard amplifier and turns on the low sensitivity amplifier. In other words, the amplifier used for detection is set to the low sensitivity amplifier. When the detection circuit is set at Step S144, then at Step S146, the control unit 20 determines whether there is an object corresponding to a human body. In other words, it is determined whether the object can be determined to be a human body even when the low sensitivity amplifier is used.

When it is determined that there is an object corresponding to a human body (Yes at Step S146), the control unit 20 determines that a human body is detected at Step S148, and proceeds to Step S152. When it is determined that there is no object corresponding to a human body (No at Step S146), the control unit 20 determines that a human body is not detected at Step S150, and proceeds to Step S152.

When a negative determination (No) is made at Step S142, or when the process of Step S148 or Step S150 is executed, the control unit determines whether the processing is to be ended at Step S152. When it is determined that the processing is not to be ended (No at Step S152), the control unit 20 proceeds to Step S140. When it is determined that the processing is to be ended (Yes at Step S152), the control unit 20 ends the processing.

In this way, the human body detecting system 1 determines whether the detected object is a human body or not with two different detection sensitivities of the standard amplifier and the low sensitivity amplifier, so that a human body can be detected with high accuracy. Specifically, the human body detecting system 1 of the embodiment determines that a human is detected when both of the outputs of the standard amplifier and the low sensitivity amplifier indicate that an object is detected as illustrated in FIG. 20, and determines that a human is not detected when the output of the standard amplifier indicates that an object is detected but the output of the low sensitivity amplifier indicates that no object is detected as illustrated in FIG. 21. The human body detecting system 1 makes a determination further with use of the low sensitivity amplifier to increase the threshold of the output voltage of the detection result of the infrared sensor 70, that is, to lower the detection sensitivity. Thus, the human body detecting system 1 makes settings by which only the case of detection of temperatures, which are close to the body temperature of humans, is determined to be the detection of a human body. With this configuration, even when the movement of a pet such as a cat and a dog is detected as the movement of a human body with use of the standard amplifier, such a situation can be identified based on the output result of the low sensitivity amplifier.

Figure 22:
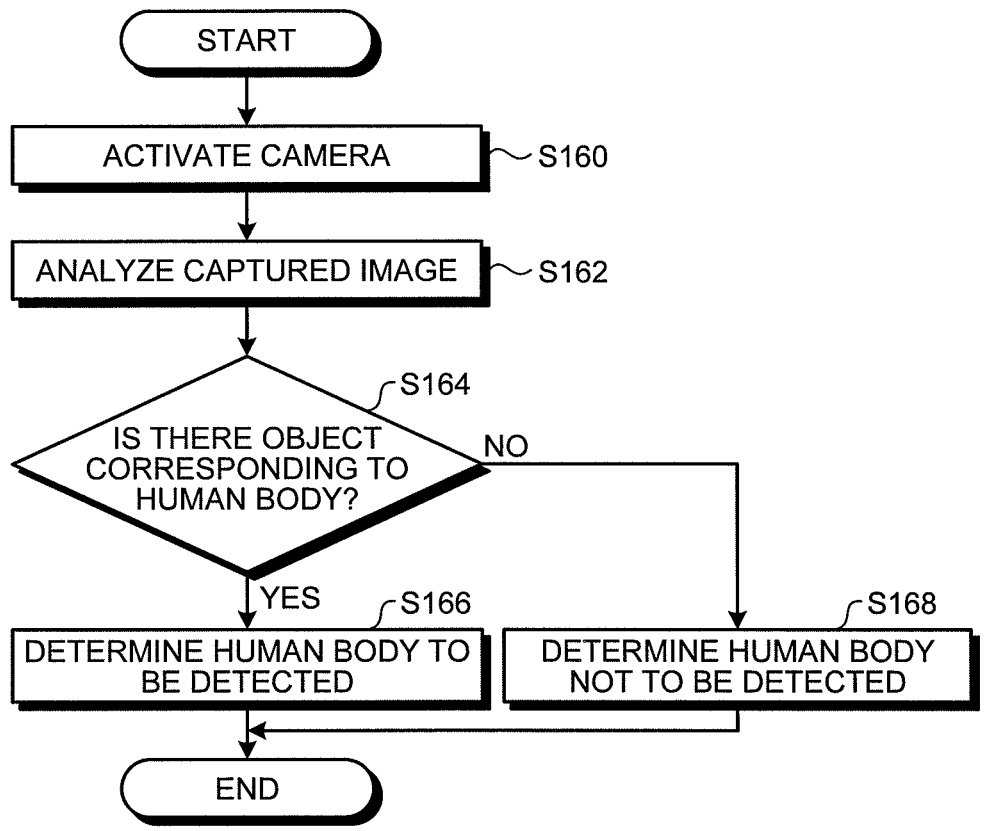
FIG. 22 is a flowchart illustrating another example of operation of the human body detecting system.

In order to further determine whether the detected object is a human body or not, the human body detecting system 1 may use a result of capturing by the camera 24. FIG. 22 is a flowchart illustrating another example of the operation of the human body detecting system. The processing illustrated in FIG. 22 may be executed in place of Step S126 when a positive determination (Yes) is made at Step S132 illustrated in FIG. 17, or may be executed in place of Step S150 when a negative determination (No) is made at Step S146 illustrated in FIG. 19.

At Step S160, the control unit 20 activates the camera 24 to start image capturing. When the camera 24 is activated at Step S160, the control unit 20 analyzes the captured image at Step S162, and determines whether there is an object corresponding to a human body at Step S164. That is, it is determined whether a human body is included in the captured image. When it is determined that there is an object corresponding to a human body (Yes at Step S164), the control unit 20 determines that a human body is detected at Step S166, and ends the processing. When it is determined that there is no object corresponding to a human body (Yes at Step S164), the control unit 20 determines that a human body is not detected at Step S168, and ends the processing.

Thus, the human body detecting system 1 detects a human body by using an image captured by the camera 24 so that the occurrence of the false detection can be reduced, and thus a human body can be detected with high accuracy.

In the embodiments, the human body detecting system 1 has a configuration in which the mobile phone 10, the charging cradle 40, and the false detection reducing unit are included, and has a configuration in which respective parts of the false detection reducing unit are embedded in the mobile phone 10 and/or the charging cradle 40, that is, a configuration in which a part of the functions of the mobile phone 10 and the charging cradle 40 is used as a part of the false detection reducing unit. However, the configuration of the human body detecting system 1 is not limited thereto.

Figure 23:
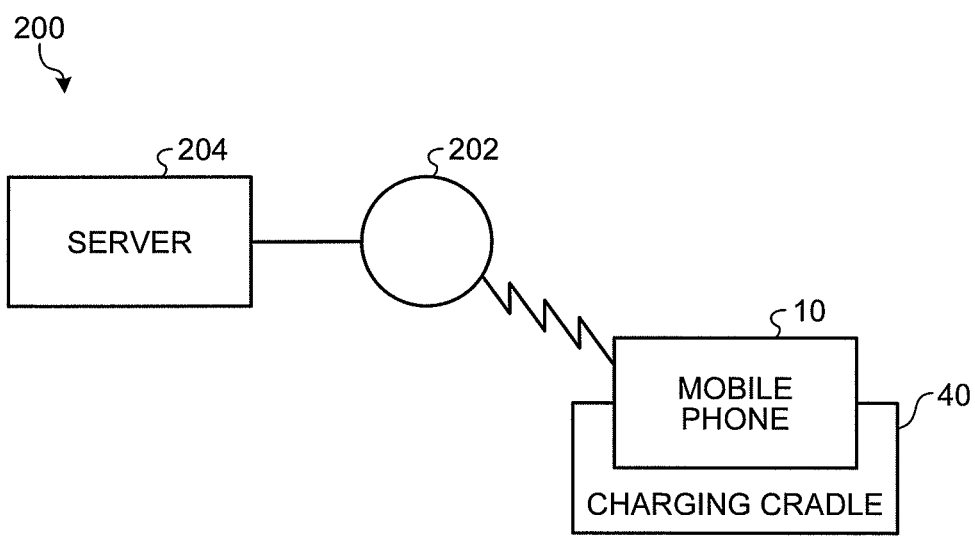
FIG. 23 is a diagram illustrating a schematic configuration of another example of a human body detecting system.

FIG. 23 is a diagram illustrating a schematic configuration of another example of the human body detecting system. A human body detecting system 200 illustrating in FIG. 23 includes a mobile phone 10, a charging cradle 40, and a server 204. The mobile phone 10 and the server 204 can perform transmission and reception of data using a public communication network 202. In this way, the human body detecting system 200 may include the server 204, and various kinds of operational functions, that is, the processes executed by the control unit may be executed by the server 204. Moreover, the human body detecting system 200 may be provided with the server 204, and data stored in the mobile phone 10 and/or the charging cradle 40 may be also stored in the server 204.

The human body detecting system 1 may execute any of above-described processes for detection of a human body in parallel. For example, the human body detecting system 1 can perform the process of determining whether it is a situation in which a false detection is likely to occur, the process of switching the amplifiers to be used, and the process of determining whether the detected object is a human body in parallel. Alternatively, the human body detecting system 1 can execute a plurality of different determination processes of determining where it is a situation in which a false detection is likely to occur in parallel.

In the embodiments, a pyroelectric infrared sensor is used as the human sensor 52; however, the human sensor is not limited thereto. Various kinds of sensors that can detect a human body in their surroundings can be used. As the human sensor 52, a sensor that detects a human body by detecting a temperature distribution in its surroundings may be used, and a pyroelectric infrared sensor that detects a change in infrared rays output from an object existing in its surroundings may be used. The human body detecting system 1 can adequately reduce the false detection by performing the above-described processing even if a pyroelectric infrared sensor is used as the human sensor 52, so that the human body detecting system that can detect a human body with high accuracy can be realized in a simple configuration.

The advantages are that one embodiment of the invention provides a human body detecting system that can detect a nearby human body with high accuracy.

What is claimed is:

1. A human body detecting system, comprising:
a mobile communication device;
a stand; and
a false detection reducing unit,
wherein
the mobile communication device includes a communication unit for performing communication,
the stand includes
a human sensor for detecting a human body based on an ambient temperature distribution, and
a storage unit for storing detection information of the human sensor,
the false detection reducing unit is configured to perform false detection reducing processing on at least one of the detection information of the human sensor and operation of the human sensor, and
the false detection reducing unit is configured to
determine whether it is a situation in which a false detection by the human sensor is likely to occur based on a communication state of the mobile communication device, and
perform the false detection reducing processing on the operation of the human sensor when it is determined that it is the situation in which the false detection is likely to occur due to the mobile communication device being in the communication state.

2. The human body detecting system according to claim 1, wherein the mobile communication device is configured to transmit the detection information processed by the false detection reducing unit to an external communication device.

3. The human body detecting system according to claim 1, wherein, when the false detection reducing unit determines that it is the situation in which the false detection is likely to occur, the false detection reducing unit is configured to perform the false detection reducing processing by stopping a detection operation of the human sensor.

4. The human body detecting system according to claim 1, wherein, when the false detection reducing unit determines that it is the situation in which the false detection is likely to occur, the false detection reducing unit is configured to perform the false detection reducing processing by (i) storing time information on time at which it is determined that the false detection is likely to occur, and (ii) invalidating the detection information corresponding to the time information.

5. The human body detecting system according to claim 1, wherein the false detection reducing unit is configured to determine that it is the situation in which the false detection is likely to occur while the mobile communication device performs wireless communication by the communication unit.

6. The human body detecting system according to claim 1, wherein
the false detection reducing unit includes a detector circuit configured to detect a high frequency signal in a vicinity of the human sensor, and
the false detection reducing unit is configured to determine that it is the situation in which the false detection is likely to occur while the high frequency signal is detected by the detector circuit.

7. The human body detecting system according to claim 1, wherein
the mobile communication device includes a housing and a vibration unit configured to vibrate the housing, and
the false detection reducing unit is configured to determine that it is the situation in which the false detection is likely to occur while the vibration unit vibrates the housing.

8. The human body detecting system according to claim 1, wherein
the false detection reducing unit includes an acceleration sensor for detecting a vibration of the stand, and
the false detection reducing unit is configured to determine that it is the situation in which the false detection is likely to occur while the acceleration sensor detects the vibration of the stand.

9. The human body detecting system according to claim 1, wherein the false detection reducing unit is configured to
detect a movement of an object by analyzing the detection information of the human sensor, and
prevent a determination that a human body is detected in a case where a movement pattern of the object is a movement pattern of an object other than a human body.

10. The human body detecting system according to claim 1, wherein the false detection reducing unit is configured to
detect a movement of an object by analyzing the detection information of the human sensor, and
prevent a determination that a human body is detected in a case where a movement pattern of the object is not a movement pattern of a human.

11. The human body detecting system according to claim 1, wherein the human sensor includes a switching unit configured to switch a detection sensitivity of the ambient temperature distribution to another detection sensitivity among a plurality of detection sensitivities.

12. The human body detecting system according to claim 11, wherein
the switching unit includes a plurality of amplifiers configured to amplify a detected signal, and
the switching unit is configured to switch the detection sensitivity by switching an amplifier used to amplify the detected signal to another amplifier among the plurality of amplifiers.

13. The human body detecting system according to claim 11, wherein the false detection reducing unit is configured to
set the detection sensitivity of the human sensor to a first sensitivity when the ambient temperature detected by the human sensor is within a threshold range with respect to a reference temperature of a human body, and
set the detection sensitivity of the human sensor to a second sensitivity when the ambient temperature detected by the human sensor is not within the threshold range with respect to the reference temperature of a human body, the second sensitivity being lower than the first sensitivity.

14. The human body detecting system according to claim 11, wherein
the mobile communication device includes a temperature sensor, and
the false detection reducing unit is configured to
set the detection sensitivity of the human sensor to a first sensitivity when a temperature detected by the temperature sensor is within a threshold range with respect to a reference temperature of a human body, and
set the detection sensitivity of the human sensor to a second sensitivity when the temperature detected by the temperature sensor is not within the threshold range with respect to the reference temperature of a human body, the second sensitivity being lower than the first sensitivity.

15. The human body detecting system according to claim 11, wherein the false detection reducing unit is configured to
switch the detection sensitivity of the human sensor to a second sensitivity when an object corresponding to a human body is detected in a state in which the detection sensitivity of the human sensor is set to a first sensitivity, the second sensitivity being lower than the first sensitivity, and
prevent a determination that a human body is detected when the object corresponding to the human body is no longer detected in the state in which the detection sensitivity of the human sensor is switched to the second sensitivity.

16. The human body detecting system according to claim 1, wherein the false detection reducing unit is configured to perform a calculation processing function that is embedded in the mobile communication device.

17. The human body detecting system according to claim 1, further comprising a server configured to perform communication with the mobile communication device,
wherein the false detection reducing unit is configured to perform a calculation processing function that is embedded in the server.

18. The human body detecting system according to claim 1, wherein the human sensor includes a pyroelectric infrared sensor configured to detect the ambient temperature distribution.

19. The human body detecting system according to claim 1, wherein
the stand includes a detection unit, and
the false detection reducing unit is configured to
determine that it is the situation in which the false detection is likely to occur while a radio wave greater than a threshold is detected by the detection unit,
perform the false detection reducing processing by stopping a detection operation of the human sensor when the radio wave greater than the threshold is detected by the detection unit, and
keep determining whether said radio wave greater than the threshold is detected by the detection unit after the detection operation of the human sensor is stopped.

* * * * *